US012774529B2

(12) United States Patent
Terry et al.

(10) Patent No.: US 12,774,529 B2
(45) Date of Patent: Oct. 27, 2026

(54) SOLID-ROCKET PROPELLANT COATINGS

(71) Applicant: Anduril Industries, Inc., Costa Mesa, CA (US)

(72) Inventors: Brandon Courtney Terry, St. George, UT (US); Arrelaine A. Dameron, Boulder, CO (US); David M. King, Sudbury, MA (US)

(73) Assignee: Anduril Industries, Inc., Costa Mesa, CA (US)

( * ) Notice: Subject to any disclaimer, the term of this patent is extended or adjusted under 35 U.S.C. 154(b) by 1154 days.

(21) Appl. No.: 17/262,418

(22) PCT Filed: Jul. 23, 2019

(86) PCT No.: PCT/US2019/042996
§ 371 (c)(1),
(2) Date: Jan. 22, 2021

(87) PCT Pub. No.: WO2020/101762
PCT Pub. Date: May 22, 2020

(65) Prior Publication Data
US 2021/0292912 A1 Sep. 23, 2021

Related U.S. Application Data

(60) Provisional application No. 62/702,132, filed on Jul. 23, 2018.

(51) Int. Cl.
*C23C 30/00* (2006.01)
*C06B 33/00* (2006.01)
*C06B 45/18* (2006.01)
*C22C 21/00* (2006.01)
*F02K 9/10* (2006.01)

(52) U.S. Cl.
CPC ............ *C23C 30/005* (2013.01); *C06B 33/00* (2013.01); *C06B 45/18* (2013.01); *C22C 21/00* (2013.01); *F02K 9/10* (2013.01)

(58) Field of Classification Search
None
See application file for complete search history.

(56) References Cited

U.S. PATENT DOCUMENTS 3,106,497 A 10/1963 Weil
3,133,841 A 5/1964 Kuehl
(Continued)

FOREIGN PATENT DOCUMENTS

WO WO-9207665 A1 * 5/1992 .............. B22F 7/002
WO WO 2016/144955 9/2016
WO WO 2020/101762 5/2020

OTHER PUBLICATIONS

Foreign patent (Year: 1992).*
(Continued)

*Primary Examiner* — Aileen B Felton
(74) *Attorney, Agent, or Firm* — Knobbe, Martens, Olson & Bear, LLP

(57) ABSTRACT

Coated Al—Li alloys, such as coated particles of Al—Li alloys, are provided. The coated alloys may be used in solid-rocket propellants. Additionally, methods of making such coated alloys, alloys coated with various methods, and solid-rocket propellants comprising such coated alloys are also provided.

13 Claims, 11 Drawing Sheets

(56) References Cited

U.S. PATENT DOCUMENTS

| | | | |
|---|---|---|---|
| 3,153,903 A | 10/1964 | Morrell | |
| 3,377,955 A | 4/1968 | Hodgson | |
| 3,381,473 A * | 5/1968 | Kuehl | C10L 1/12 60/219 |
| 3,695,952 A | 10/1972 | Allen | |
| 4,717,068 A | 1/1988 | Meyer | |
| 5,861,571 A | 1/1999 | Scheffee et al. | |
| 6,666,936 B1 | 12/2003 | Jorgensen et al. | |
| 9,850,182 B2 | 12/2017 | Terry et al. | |
| 10,519,075 B2 | 12/2019 | Terry et al. | |
| 2003/0024617 A1 | 2/2003 | Reed, Jr. et al. | |
| 2006/0040183 A1 | 2/2006 | Jiang et al. | |
| 2014/0034197 A1 | 2/2014 | Sippel et al. | |
| 2017/0240484 A1 | 8/2017 | Terry et al. | |
| 2017/0294644 A1 | 10/2017 | Burshtain et al. | |

OTHER PUBLICATIONS

Zhang et al., "Effect of Iron Coating on Thermal Properties of Aluminum-Lithium Alloy Powder," Propellants Explos. Pyrotech, vol. 42, pp. 953-959 (2017).

Garreau et al., "Cycling Behavior of Lithium and Aluminum-Lithium Electrodes in Propylene Carbonate and Dioxolane Electrolytes," Proceedings of the workshop on lithium nonaqueous battery electrochemistry, vol. 80, pp. 158-180 (1980).

International Search Report for PCT/US2019/042996, mailed on May 27, 2020.

Written Opinion of the International Searching Authority for PCT/US2019/042996, mailed on May 27, 2020.

Supplementary European Search Report in application no. EP 19884362.5, dated May 2, 2022, in 8 pages.

Brandon, "Altered Combustion Characteristics of Metalized Energetics due to Stable Secondary Material Inclusion," Dissertation, Purdue University, ProQuest No. 3734377, 2015, in 24 pages.

Sigma-Aldrich, "Lithium-aluminum alloy," Jun. 22, 2015, at: https://web.archive.org/web/20150622023236/http://www.sigmaaldrich.com/catalog/product/aldrich/426490?lang=en&region=US>, in 3 pages.

Watanabe et al., "High Purity Aluminum-Lithium Master Alloy by Molten Salt Electrolysis," Journal de Physique Colloques, 1987, vol. 48(C3):C3-85-C3-91.

* cited by examiner

SOLID-ROCKET PROPELLANT COATINGS

This application is a national stage application under 35 U.S.C. § 371 of International Application No. PCT/US2019/042996, filed Jul. 23, 2019, which claims priority to, and the benefit of, U.S. Provisional Patent Application No. 62/702,132, filed on Jul. 23, 2018, the entire contents of which are specifically incorporated by reference herein. The entire contents of PCT/US2016/021370, filed on Mar. 8, 2016, and published as WO 2016/144955, are also specifically incorporated by reference herein.

Traditional solid rocket propellants are composed of three basic ingredients: ammonium perchlorate (AP), fine aluminum powder, and a hydrocarbon-based binder (typically polybutadienes). The aluminum powder is used to provide a higher heat of combustion and thus higher specific impulse (Isp) in rocket motor configurations (i.e., higher total thrust per unit mass of propellant). While aluminum is the most commonly used metallic fuel for solid propellants, it does have several undesirable characteristics.

First, aluminum has a native passivating oxide layer on the surface that can only be penetrated by oxidizing agents that are smaller than $O_2$ gas molecules, thus making initial particle ignition difficult.

Second, molten aluminum particles form on the surface of the propellant and sinter and agglomerate to form large molten droplets (LMD), which delay full combustion and cause two-phase flow losses when traveling through a nozzle due to thermal and viscous disequilibrium.

Third, unburned aluminum acts like a solvent to graphite, which can remove up to about 0.022 thousandths of an inch per second from a graphite nozzle insert during motor operation.

Recent work has shown that using an aluminum-lithium (Al—Li) alloy can have several benefits over neat aluminum in a typical solid propellant and ameliorate the problems identified. AP is comprised of 30.2% chlorine by weight, which favors the formation of corrosive hydrochloric acid (HCl) during motor combustion. With an Al—Li alloy, the chlorine is scavenged to form a lithium chloride (LiCl) salt.

The formation of LiCl over HCl frees more $H_2$ gas during propellant combustion, lowering the bulk molecular weight of the combustion products and thus increasing Isp. The lithium within the Al—Li alloy boils at a much lower temperature than aluminum causing intraparticle lithium gas formation within the LMD, resulting in rapid microexplosion and atomization of the Al—Li droplets. These microexplosions may reduce metal combustion residence times, two-phase flow losses, and nozzle ablation rates.

While using an Al—Li alloy does have many benefits, it does have one major drawback: it is prone to rapid ageing of the active metal content when in a moist environment. Neat aluminum has a native passivating oxide layer that is nominally about 3 nm thick. While that oxide layer can inhibit ignition, it also blocks moist air from penetrating and reacting with the neat aluminum metal below the oxide surface. This oxide layer provides aluminum-based solid propellants with excellent ageing properties. Thus, although there is a degradation in performance, the formation of an aluminum oxide coating in a neat aluminum fuel is beneficial.

With Al—Li alloys, the lithium is halophilic and thus prefers the formation of a salt (LiCI, LiOH, etc.) over the formation of an oxide layer. In a moist environment, this makes the Al—Li alloy reactive with the water in the air, thus causing lithium hydroxide (LiOH) to rapidly form on the surface of the particles. It does not appear that the LiOH is passivating, as the particles continue to degrade and lose active metal content over time. This trait causes Al—Li based solid propellants to rapidly age and may cause stability issues if mixed in humid environments. Furthermore, it has been demonstrated that a polybutadiene-based binder is permeable to both air and moisture, thus metal degradation can occur even after mixing has occurred.

The reactivity of Al—Li with water can be drastically reduced and in some cases completely arrested if the Al—Li particles are coated with another material before any significant metal surface degradation has occurred. Coatings have been explored with solid-rocket propellants in the past. Typical coatings that have been investigated include polymers (e.g., Viton A, low-density polyethylene, etc.), and surfactants (e.g., oleic acid, palmitic acid, etc.). These coatings have not gained widespread acceptance because of the difficulty of coating solids with such materials. In addition such coatings suffer from contributing to a lack of thermochemical performance. It would be advantageous therefore, to have different coatings that would not suffer from the drawbacks of the prior art and provide the benefits required in solid-rocket propulsion. More recently, iron has been reported as a rocket coating; however, it too leads to worse thermochemical performance.

SUMMARY OF THE DISCLOSURE

In one embodiment of the disclosure, an aluminum coated Al—Li alloy is provided.

In another embodiment of the disclosure, aluminum coated Al—Li alloy particles are provided.

In a further embodiment of the disclosure, a process for preparing aluminum-coated Al—Li alloy is provided.

In a still further embodiment of the disclosure, aluminum-coated Al—Li alloy prepared by a coating process is provided.

In an additional embodiment of the disclosure, a solid-rocket propellant comprising an Al—Li alloy with a weight ratio of Li to Al between about 14% and 34% by mass and further coated with aluminum, an oxidizer, and a binder is provided.

In another embodiment of the disclosure, a process for reducing hydrogen chloride formation in solid-rocket combustion comprising the steps of combining Al and lithium to form an alloy, coating the alloy with aluminum, combining the aluminum-coated alloy with an oxidizer and a binder to form a propellant, and combusting the propellant is provided.

In a further embodiment of the disclosure, a method for producing a solid-rocket propellant is provided comprising formulating aluminum and lithium to form a plurality of formulated Al—Li metal particles, coating the particles with aluminum, and combining the coated Al—Li particles with a chlorine-containing oxidizer and a binding agent to form a solid-rocket propellant.

In a still further embodiment of the disclosure, a solid-rocket propellant is provided comprising an aluminum-coated Al—Li alloy, a binder, and an oxidant is provided.

In an additional embodiment of the disclosure, an Al—Li alloy coated with a metal oxide is provided.

In a further embodiment of the disclosure, a solid-rocket propellant comprising a metal-oxide-coated Al—Li alloy, an oxidizer, and a binder is provided.

Additional embodiments of the disclosure include one or more particles of an Al—Li alloy coated with a coating that comprises at least one metal, metalloid, or non-metal, and solid-rocket propellants comprising the coated alloy particles.

Apparatus of Example 9 and Example 10.

Figure 8:
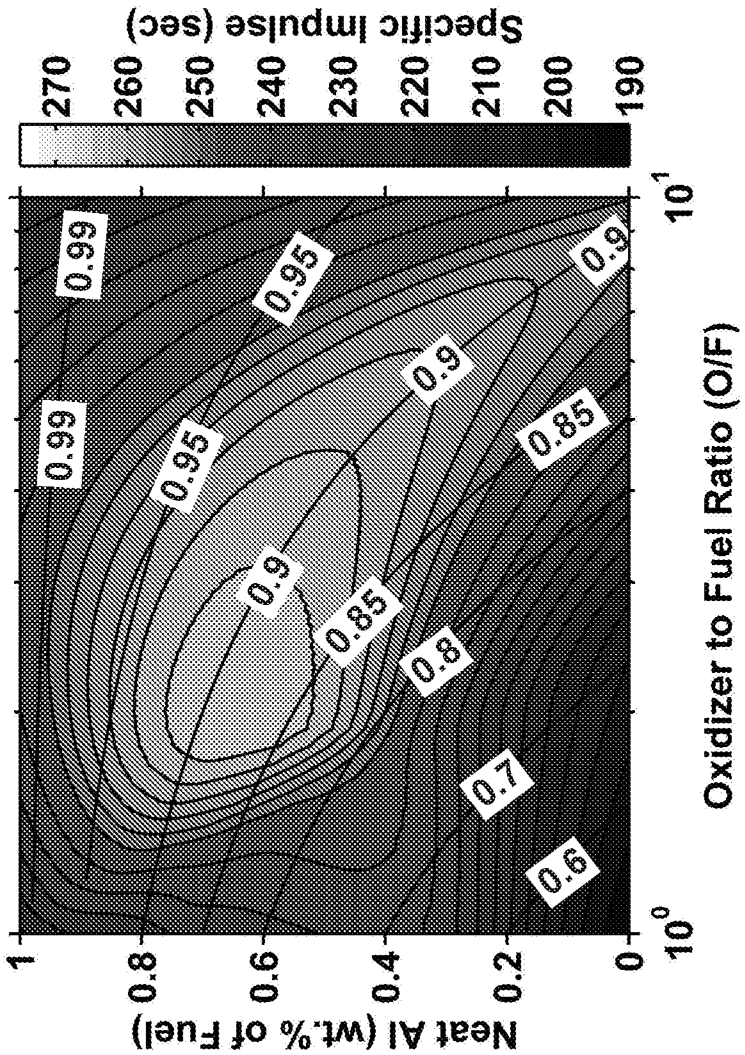

FIG. 8 shows a thermochemical simulation of equilibrium results for 80/20 Al—Li/AP/HTPB.

Figure 9:
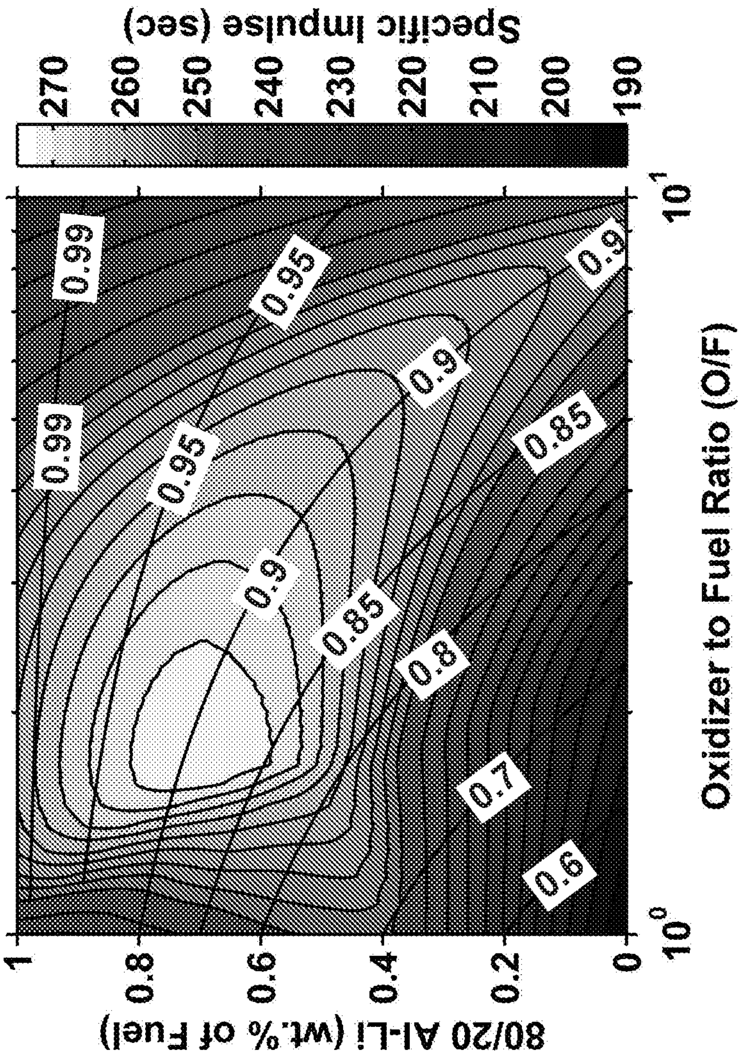

FIG. 9 shows a thermochemical simulation of equilibrium results for neat lithium/AP/HTPB.

Figure 10:
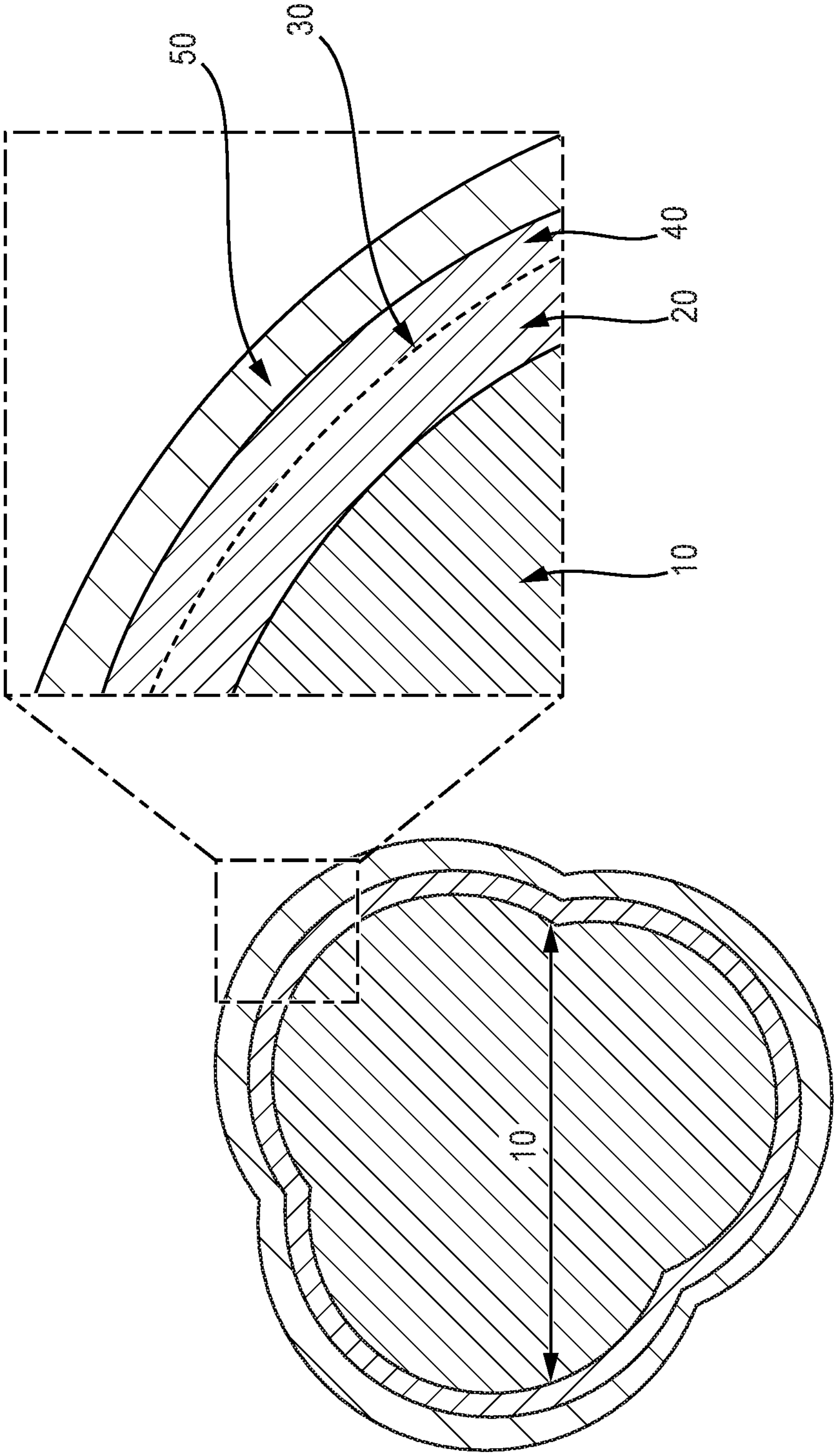

FIG. 10 is a schematic of a coated Al—Li alloy particle.

Figure 11:
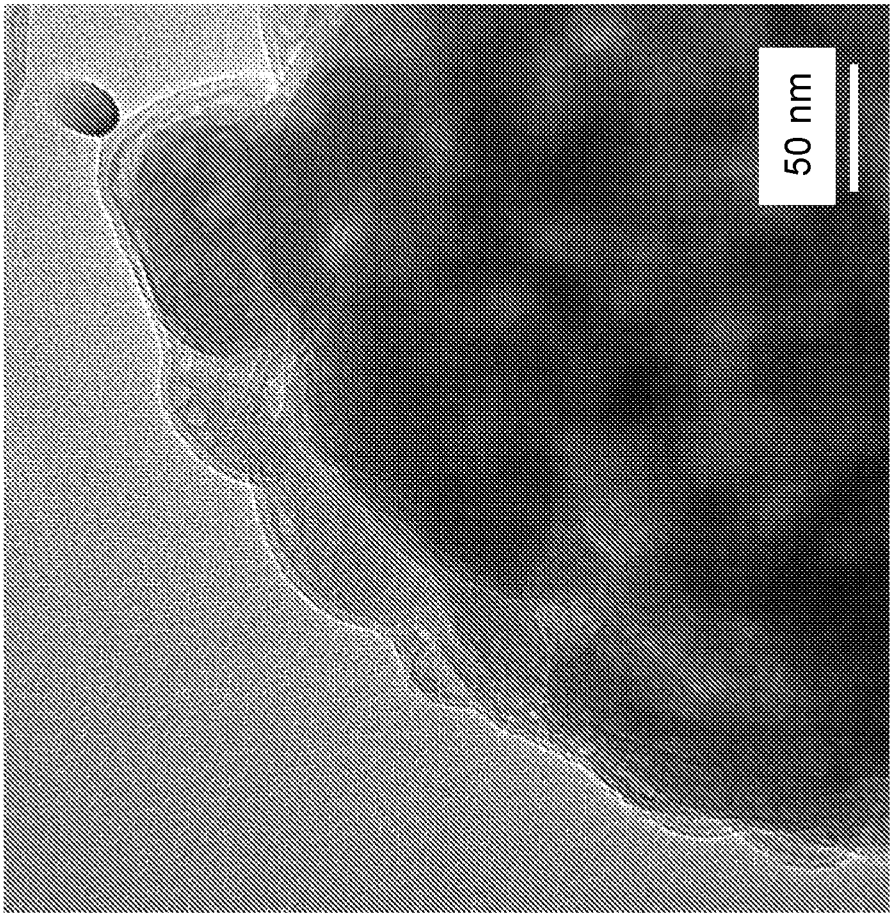

FIG. 11 shows a transmission electron microscope image of a coated Al—Li alloy particle.

DETAILED DESCRIPTION

Aluminum coatings are particularly advantageous for Al—Li solid-rocket fuels for several reasons. For example, since the coating burns during combustion, aluminum provides a much higher benefit than the coatings of the prior art in terms of combustion and rocket performance. For example, aluminum is a far superior fuel to aluminum oxide and, additionally, aluminum has higher density than many other organic coatings which provides for a high impulse density and thrust per unit volume.

It has been further demonstrated that aluminum coatings form a diffusion layer between the coating and the base Al—Li alloy particle. For purposes of this disclosure, an Al—Li alloy is "coated" with aluminum or other material whether or not a diffusion layer is formed at the interface of the alloy and the coating material applied to it. The diffusion layer transitions between pure aluminum on one side and the Al—Li phase on the other and represents aluminum-lithium exchange at the Al—Li interface with the aluminum coating. Aluminum-lithium exchange allows for an extremely strong bonding between the aluminum coating and the base Al—Li alloy particle. By comparison, prior art organic coatings are difficult to apply because there is no bonding interaction to hold the coatings in place. Further, by increasing the strength of the coating, and because the aluminum coating is stronger than any other coating tested herein, it is less likely to break during processing.

Figure 1:
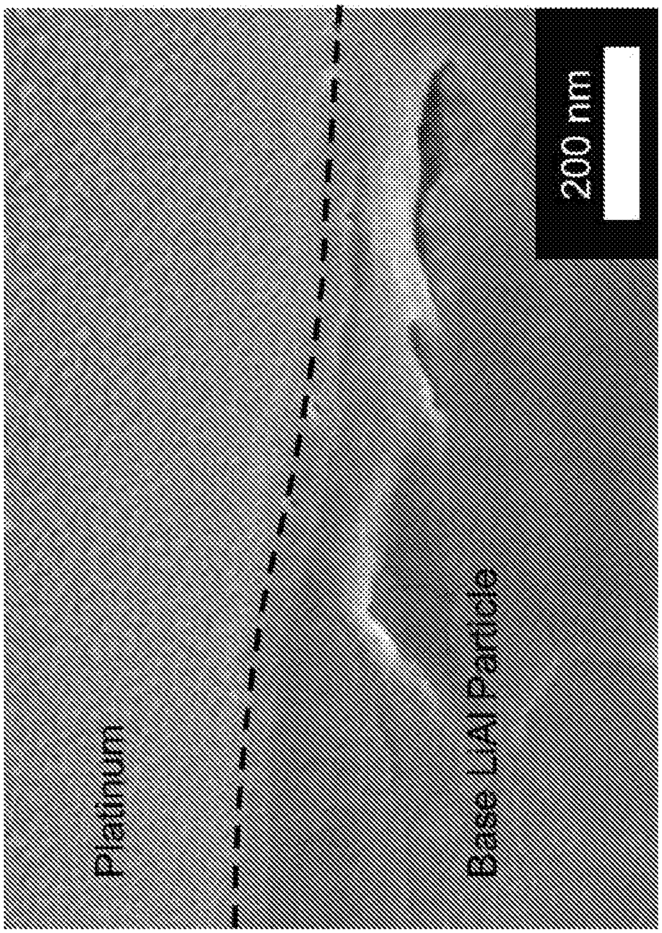
FIG. 1 is a scanning electron microscope image of a focused ion beam cross section of an Al—Li alloy particle.
Figure 2:
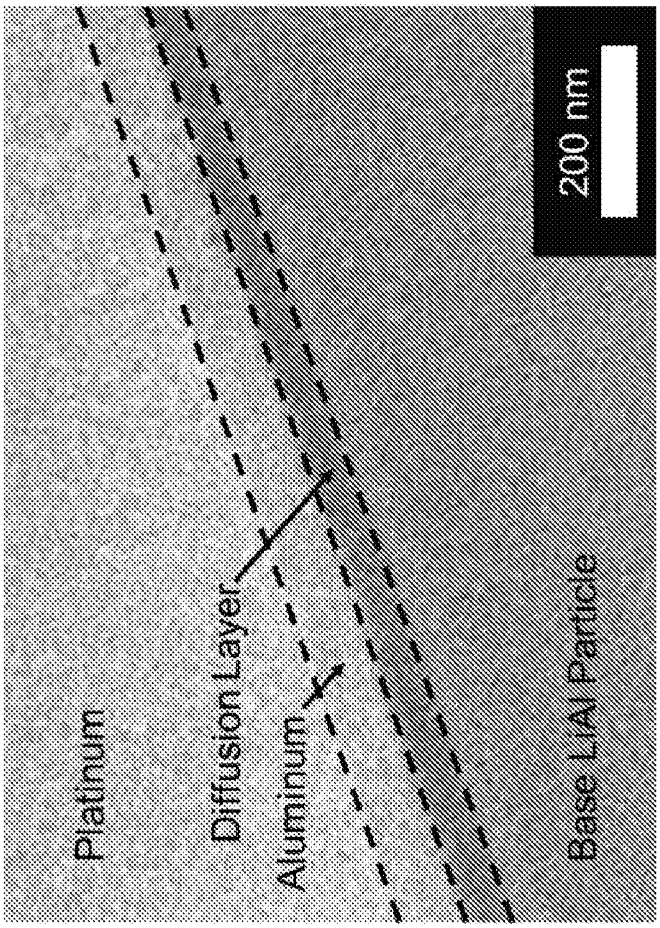
FIG. 2 is a scanning electron microscope image of a focused ion beam cross section of an Al—Li alloy particle coated with aluminum.

The actual diffusion layer thickness for a nominally 100 nm coating of neat aluminum onto Li—Al alloy particles was evaluated in such particles made in accordance with Example 1. The evaluation was completed using a scanning electron microscope (SEM) and a focused ion beam (FIB) to create a cross section of the coated particle surface. In this process, a layer of platinum was deposited on the coated particle in order to reduce any smearing at the surface during the FIB cutting process. FIB cross sections of the Li—Al alloy particles before coating is set forth in FIG. 1 and after the aluminum coating is provided in FIG. 2. Using this coating process, it was observed that a nominally 100 nm aluminum deposition resulted in a diffusion layer of approximately 54 nm thick and leaving a layer of neat aluminum of approximately 83 nm thick. This would indicate that the diffusion layer crosses into both the aluminum layer and into the Li—Al alloy particle by roughly 17 nm and 37 nm respectively. Thus, more diffusion occurs into the Li—Al alloy particle than into the aluminum coating making the strength of the coating particularly robust. Aluminum can be coated with high efficiency in that full or nearly full encapsulation can be achieved in many embodiments herein. Nearly full encapsulation includes, for example, 80% or more encapsulation, such as 85% or more, 90% or more, or 95% or more encapsulation. This efficiency can be confirmed by SEM, for example.

The thickness of the aluminum on the coating of aluminum-lithium in many embodiments may be between about 50 nm and 1 micron. Other thicknesses include between about 50 nm and 900 nm, between about 100 nm and 800 nm, and between about 50 nm and 500 nm. Additional thicknesses include between about 1 nm and about 10 nm, between about 2 nm and about 20 nm, between about 5 nm and about 30 nm, between about 5 nm and about 10 nm, and between about 1 nm and about 5 nm. Other values include between about 50 nm and about 100 nm; between about 100 nm and about 1 micron, about 100 nm and about 900 nm and between about 100 nm and about 500 nm. In some embodiments, the coating may be up to about 20% by weight of the aluminum in the aluminum-coated Al—Li alloy, such as in Al—Li alloy particles.

Many methods may be employed to coat an Al—Li alloy such as with aluminum. For example, such methods include mechanical ball milling, chemical processes, atomic layer deposition (ALD), physical liquid deposition, and physical vapor deposition, (also known as "thermal evaporation"). In the thermal evaporation process, the uncoated Al—Li particles are placed into a chamber with aluminum targets. The chamber is then subjected to a high vacuum. While under high vacuum, the aluminum targets are heated until sublimation of the aluminum targets occurs, forming an aluminum cloud within the chamber. The uncoated Al—Li particles may then be placed into the aluminum cloud for finite residence times. The longer the residence time, the more interactions that the Al—Li particles will have with the aluminum gas molecules which can lead to thicker coatings. Using such methods, it is possible to control the thickness of the aluminum coatings, from, for example, nanometer thickness up to micron thickness. In addition, the thermal evaporation process acts to surface-anneal the Al—Li particle during coating which acts to purify it from undesired contaminants in an un-alloyed surface lithium, thus increasing stability and thermochemical performance of the particle.

Once Al—Li particles have been coated with aluminum, they can be extracted from the vacuum chamber or other coating deposition system and used in solid propellant mixing. Because of the inherent strength of a bonded aluminum coating (due to the diffusion layer), the coating should remain intact during any physical mixing procedure, and will be more robust than organic coating currently deployed in the prior art. Typical particle sizes are between about 10 microns and 200 microns including between about 10 microns and about 100 microns, including between about 20 microns and 50 microns, including between about 25 microns and 50 microns and values in between such as about 26, 27, 28, 29, 30, 31, 32, 33, 34, 35, 36, 37, 38, 39, 40, 41, 42, 43, 44, 45, 46, 47, 48, 49, and 50 microns. As particle size decreases, the formulations become hard or brittle which is disadvantageous from a handling and performance perspective. By "particle size" what is meant is the volume-weighted mean particle size.

The thicker the coating, the more of an effect the aluminum coating will have on the resulting combustion properties because the inclusion of extra aluminum coating into the system changes thermal equilibrium during combustion. Such changes may be beneficial. For example, if the uncoated Al—Li particles are 20 wt. % lithium, by putting sufficient aluminum coating such that the lithium percentage drops to about 17% lithium content, more favorable combustion products will be formed in that all lithium will form LiCl with a standard AP oxidant and overall propellant density impulse will increase. The degree of aluminum addition into the system will be driven by both the desired coating thickness as well as the size of base Al—Li alloy particle because the same coating thickness on 10 μm uncoated particles will have a much larger bulk aluminum addition than on 100 μm uncoated particles. In many embodiments, the Al—Li alloy is prepared as particles.

Figure 3:
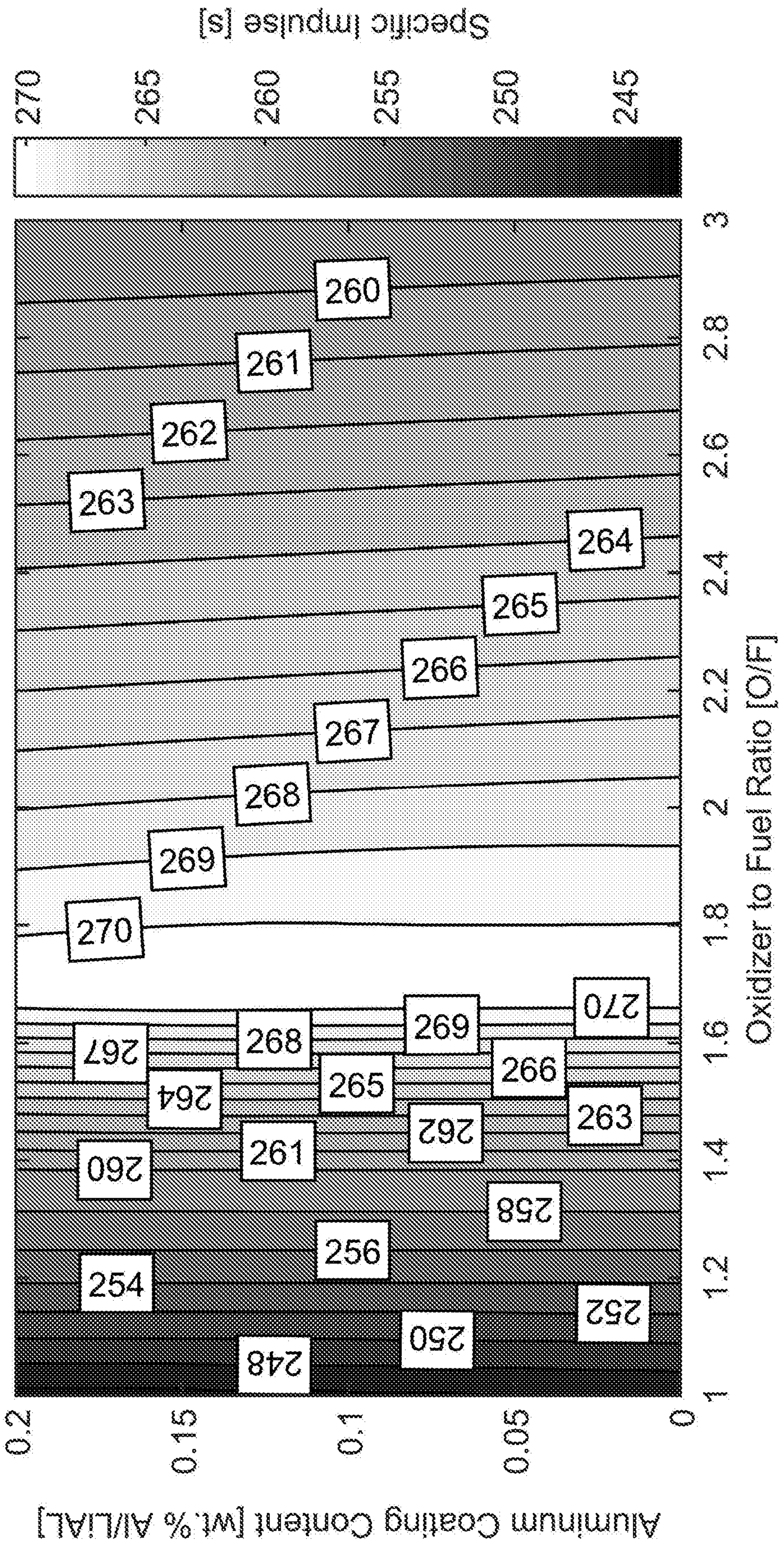
FIG. 3 shows a thermochemical simulation of a solid-rocket propellant of the disclosure it Al—Li with an aluminum coating.
Figure 4:
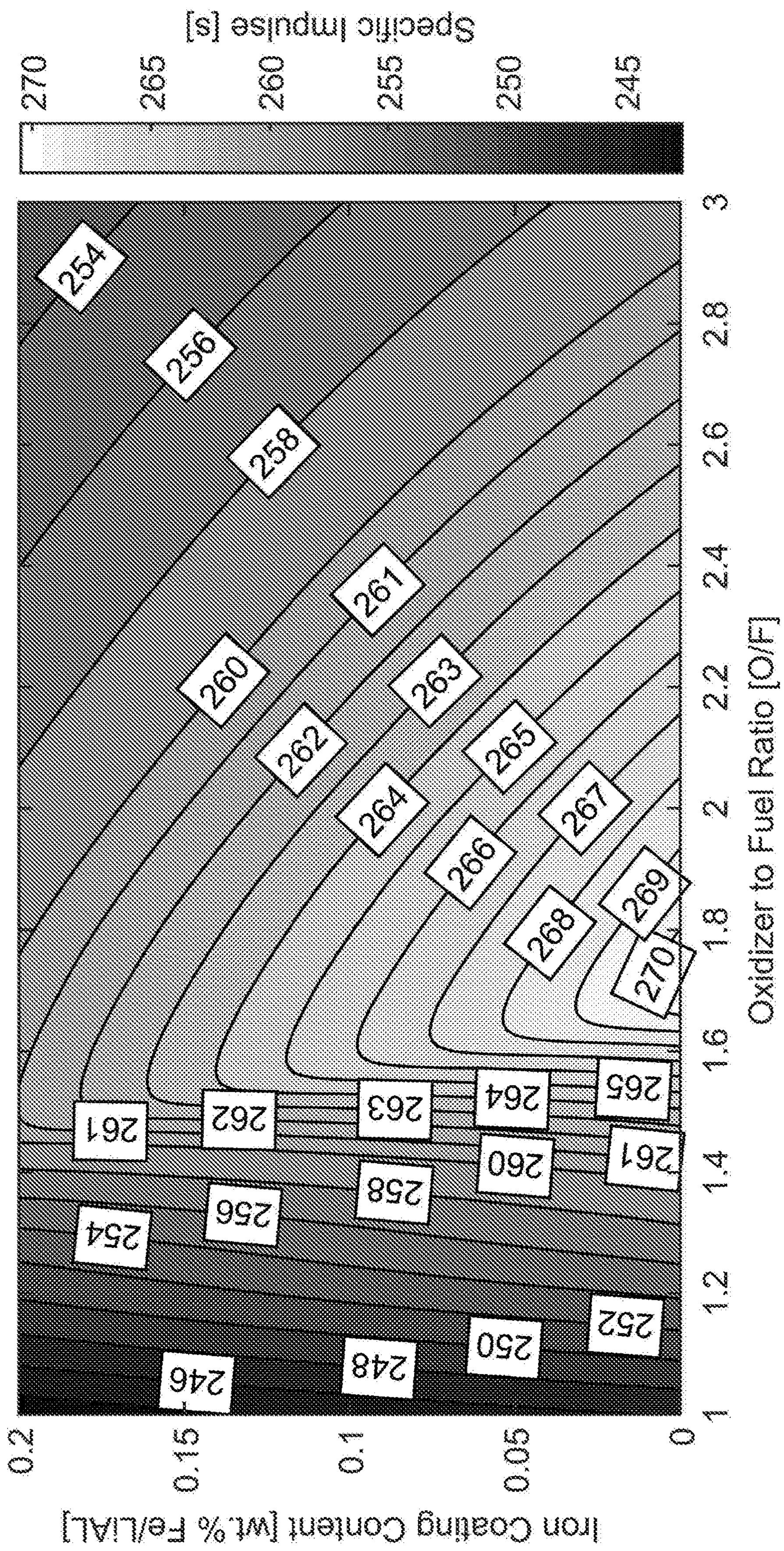
FIG. 4 shows a thermochemical simulation of a solid-rocket propellant of the disclosure it Al—Li with an iron coating.
Figure 5:
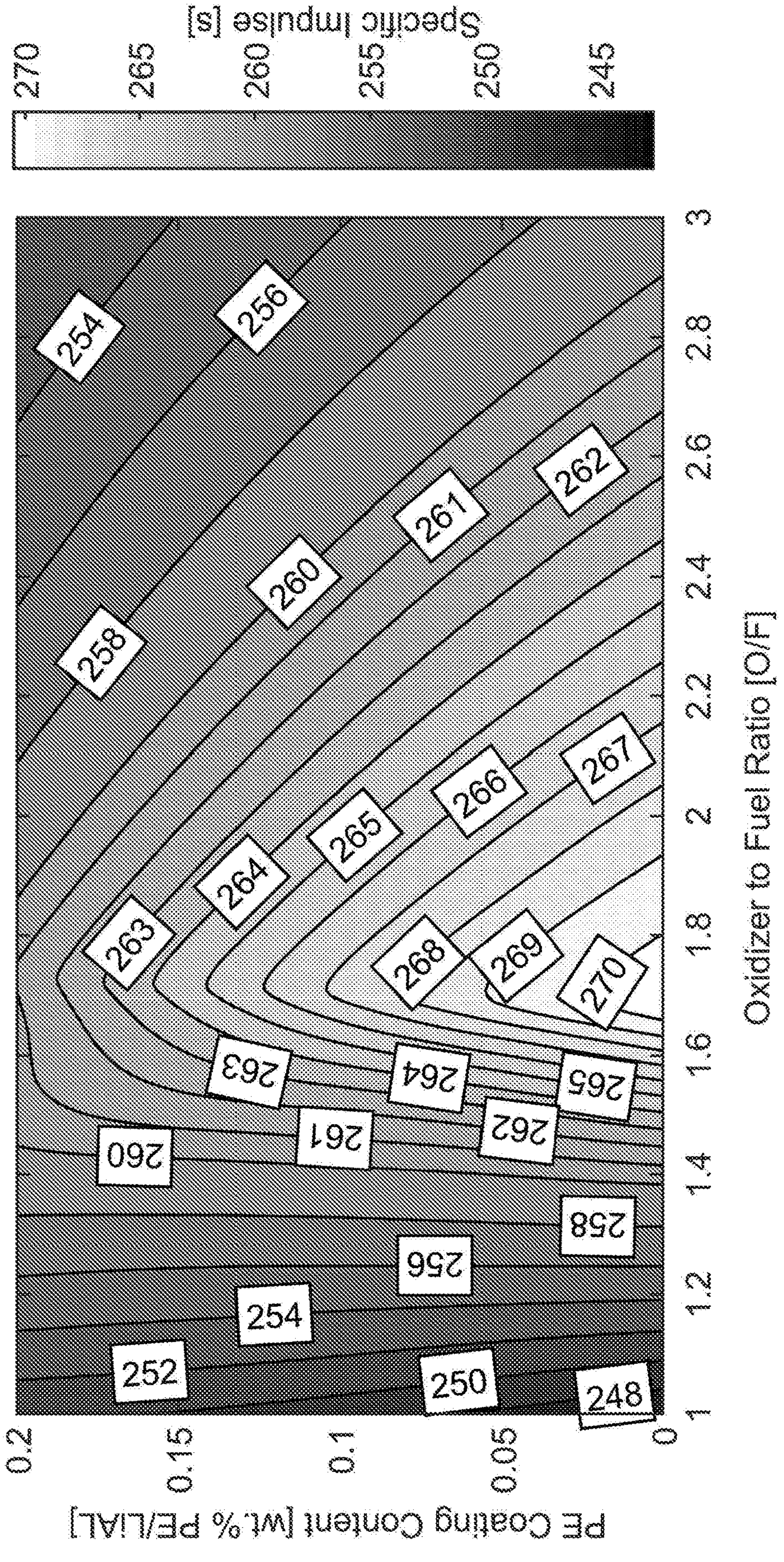
FIG. 5 shows a thermochemical simulation of a solid-rocket propellant of the disclosure it Al—Li with a polyethylene coating.
Figure 6:
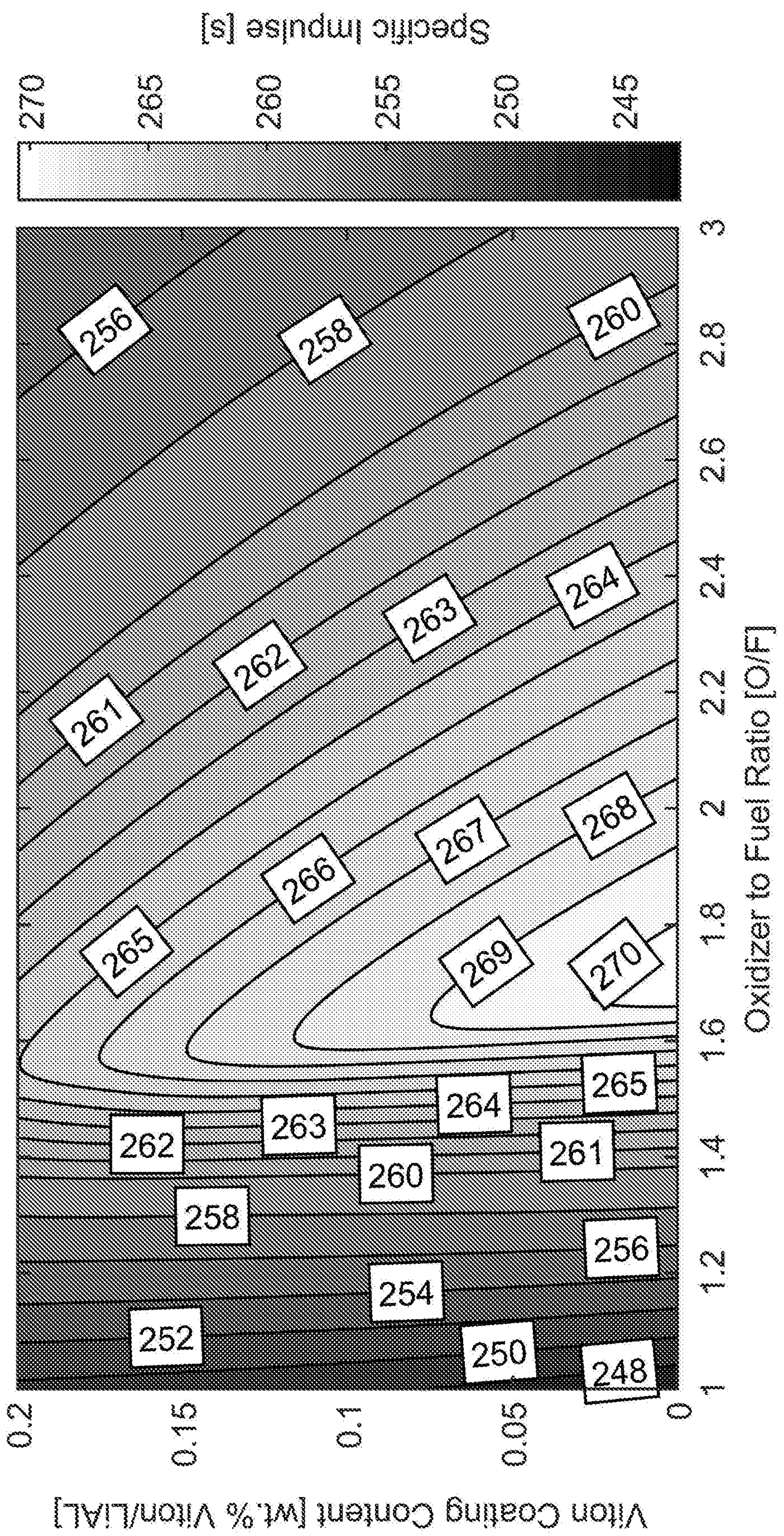
FIG. 6 shows a thermochemical simulation of a solid-rocket propellant of the disclosure it Al—Li with a Viton® Coating.

As shown herein, aluminum is a preferred coating over other materials. FIG. 3 (aluminum), FIG. 4 (iron), FIG. 5 (polyethylene), and FIG. 6 (Viton®) are thermochemical simulations done as set forth in Example 8. These figures are comparisons of coatings of Al—Li alloy with various materials. The contour lines show specific impulse at values of various oxidizer-to-fuel ratios (x-axis) and percentage of the Al—Li alloys which are coated (up to 20% on the y-axis). The higher the specific impulse, the better the propellant performance. As can be seen from FIG. 3, the maximum 270s specific impulse is seen with the aluminum coating at all coating levels at oxidizer/fuel ratios of about 1.6 up to almost 1.9. None of the other coatings have such a robust performance.

For iron, the 270s impulse tops out at about 3 or 4% coating which is insufficient to get a coating benefit (e.g., encapsulation). Likewise, neither polyethylene or Viton® have the same robust specific impulse as aluminum as a coating. Indeed, for a coating of about 10%, which with some particles may be sufficient to encapsulate, only the aluminum coating still provides a 270s maximum specific impulse.

An additional embodiment of the disclosure includes one or more particles of an Al—Li alloy coated with a coating that comprises at least one metal, metalloid, or non-metal. The metal, metalloid, or non-metal may be in the form of a zero-valent element. The metal, metalloid, or non-metal may instead be present in a molecule in which it is covalently bound to one or more other elements. The "coating that comprises at least one metal, metalloid, or non-metal" therefore includes a coating in which the metal, metalloid or non-metal is in the form of a zero-valent element as well as a coating in which the metal, metalloid or non-metal is present in a molecule in which it is covalently bound to one or more other elements. For example, the metal, metalloid, or non-metal may be in the form of an oxide, a nitride, a carbide, a halide, a phosphate or any combinations of any of these.

Exemplary embodiments include aluminum, silicon, boron, hafnium, tin, iron, magnesium, titanium, zirconium or beryllium in the coating, either as a zero-valent element or in a molecule covalently bound to one or more other elements. In some embodiments, the coating comprises aluminum, silicon, or both aluminum and silicon. Non-limiting examples of coatings are those that may comprise silicon oxide and aluminum oxide, aluminum oxide and silicon nitride, silicon oxide and aluminum nitride, and silicon oxide and aluminum phosphate.

Exemplary metalloids include As, At, B, Ge, Po, Sb, Si and Te.

Exemplary metals include Ac, Ag, Al, Am, Au, Ba, Be, Bi, Bk, Ca, Cd, Ce, Cf, Cm, Co, Cr, Cs, Cu, Dy, Er, Es, Eu, Fe, Fm, Fr, Ga, Gd, Hf, Hg, Ho, In, K, La, Li, Lr, Lu, Md, Mg, Mn, Mo, Na, Nb, Nd, Ni, No, Np, Os, Pa, Pb, Pd, Pm, Pr, Pt, Pu, Ra, Rb, Re, Rh, Ru, Sc, Si, Sm, Sn, Sr, Ta, Tb, Tc, Th, Ti, TI, Tm, U, V, W, Y, Yb, Zn and Zr.

Exemplary non-metals include polymers and phosphate and/or phosphorous oxynitride type materials.

In some embodiments, the coating is a hybrid inorganic/organic coating that is, for example, partially (such as about 50%) polymeric and partially (such as about 50%) metal oxide, such as aluminum alkoxide. Such coatings can be deposited, for instance, using Molecular Layer Deposition.

These coatings, and any other coatings included in this disclosure, may be applied, for instance, using a solid state, liquid state or vapor state process. Examples of solid state processes include mixing and cladding. Examples of liquid state processes include chemical bath deposition, sol-gel and electrodeposition. Examples of vapor deposition techniques include molecular layering (ML), chemical vapor deposition (CVD), physical vapor deposition (PVD), atomic layer deposition (ALD), molecular layer deposition (MLD), vapor phase epitaxy (VPE), atomic layer chemical vapor deposition (ALCVD), ion implantation and similar techniques.

The coatings can be formed, for example, by exposing the Al—Li alloy particles to reactive precursors, which react either in the vapor phase (in the case of CVD, for example) or at the surface of the particles (as in ALD and MLD). In the CVD or ALD process for example, suitable precursors to form an aluminum cation include one or more of aluminum sec-butoxide, aluminum tribromide, aluminum trichloride, diethylaluminum ethoxide, dimethylaluminum isopropoxide, tris(ethylmethylamido)aluminum, tris(dimethylamido) aluminum, triethylaluminum, triisobutylaluminum, trimethylaluminum, tris(diethylamido) aluminum, and tris (ethylmethyl-amido)aluminum. These can be coupled simultaneously or sequentially with other anion-forming precursors to produce the compounds in the coating, or these can be coupled simultaneously or sequentially with a reducing precursor to produce a coating comprising a zero-valent form of an element. For example, trimethylaluminum together with water, hydrogen peroxide, ozone or oxygen plasma may be used to deposit aluminum oxide ($Al_2O_3$); tris(diethylamido) aluminum and anhydrous ammonia may be used to deposit AlN coatings; an aluminum-comprising precursor may be paired simultaneously or sequentially with phosphine, tert-butylphosphine, tris(trimethylsilyl)phosphine, phosphorous oxychloride, triethylphosphate, trimethylphosphate to form an aluminum phosphate coating. A cation-containing or cation-forming precursor could also be paired with a multi-functional organic precursor such as ethylene glycol, ethanolamine, ethylene diamine, glycerol, or glycidol, to provide an aluminum cation and an anion comprising carbon that combine to form a compound in the coating.

In some embodiments, during the application of a coating, the average particle diameter of the Al—Li allow particles may be unaffected by the coating and the process does not cause primary particles to aggregate into rigid porous or non-porous secondary particles. In other coating processes, primary particle aggregation may occur to form larger secondary particles. If aggregation occurs during a coating process and the average particle diameter of secondary particles exceeds 100 or more times that of the primary particles, this is typically not beneficial to the resulting combustion properties. From an economic perspective, process conditions can be selected to minimize the overall cost to achieve a minimum threshold improvement in combustion properties. Multiple coating processes could also be selected to produce multiple grades of materials designed for different product lines, where sometimes minimally improved performance is desired, or sometimes greatly improved performance may be desired.

FIG. 10 is a schematic of a coated particle, comprising an Al—Li alloy particle and a coating, optionally further comprising an inner diffusion region, an interface, and an outer diffusion region. The coated Al—Li alloy particle comprises an alloy particle 10 and a coating 50, which is applied to the original interface position 30 of the coating layer prior to any diffusion. During or after the coating process, interface position 30 may disappear, forming an inner diffusion layer 20, and/or an outer diffusion layer 40. Inner diffusion layer 20 represents inward diffusion of the coating material penetrating into the substrate particle dimension; outer diffusion layer 40 represents outward diffusion of the substrate composition into the coating material thickness dimension. In the simplest case, a coating 50 does not have an interaction with the particle 10 such that diffusion layers 20 and 40 are not present. Precise coating processes such as ALD could achieve such a coated particle if desired. The particle 10, coating 50 and at least one diffusion layer may provide benefits including mechanical stability and environmental robustness during post processing steps. When at least one diffusion layer is present, it may be challenging to identify and/or isolate an interface 30 between 10 and 50. Coating processes can apply a coating 50 of, for example, 1 nanometer to 500 nanometers in thickness, and form a diffusion layer having a total thickness (20+40) of 0.1 to 33% of the coating thickness. The diffusion layers can, for example, have a thickness of 20 greater than a thickness of 40, where the thickness of the inner diffusion layer 20 is at least 10%, preferably 25%, oftentimes 50%, and sometimes 100% greater than the thickness of the outer diffusion layer 40.

In some embodiments, coating 50 is in an amorphous or glassy phase. Such coatings may provide superior stability against reactivity with moisture, air or other environmental constituent. Coating 50 may increase the shelf-life of a metal fuel particle by 10, 20, 50 or 100%, and/or prevent the premature ignition of the fuel in a solid-rocket propellant. Silicate and aluminate materials can enhance moisture stability of metal fuel particles. In some embodiments, coating 50 comprises at least 80% silicate and has a thickness of 2 to 20 nanometers. In other embodiments, coating 50 comprises at least 80% aluminate and has a thickness of 2 to 20 nanometers. Coating 50 may, for example, comprise an oxide, nitride, halide or phosphate of a metal, metalloid or non-metal, and optionally form an inner diffusion layer 20 that comprises 60-90% lithium or aluminum, an outer diffusion layer 40 that comprises 10-40% lithium or aluminum, or both.

FIG. 11 shows a transmission electron microscope image of a coated Al—Li alloy particle having a diffusion region of about 1 nanometer in thickness and a coating of about 5 nanometers in thickness. The coating is an $Al_2O_3$ film on the surface of the alloy particle.

In some embodiments, one or more coated Al—Li alloy particles of the disclosure can themselves be further coated. Such an embodiment can include, for example, one or more Al—Li alloy particles having an average particle size of 10 to 100 microns, a first coating of an aluminum oxide layer of 0.1 to 5.0 nanometers in thickness over the particles (formed for instance by an ALD process), and a second coating of a silicon oxide layer of 0.1 to 5.0 nanometers in thickness over the first coating (formed for instance using an ALD process). Under certain conditions, a first diffusion layer and a second diffusion layer may form (the first diffusion layer between the alloy particle and first coating layer, and the second diffusion layer between the first coating layer and the second coating layer), each having a composition represented by the formula $Li_aAl_bSi_cO_d$. Exemplary ranges for a first diffusion layer include: $0.1<a<0.2$, $0.6<b<0.9$, $0<c<0.1$, and $0.01<d<0.2$. Exemplary ranges for a second diffusion layer include: $0<a<0.05$, $0.2<b<0.8$, $0.01<c<0.3$, and $0.2<d<0.6$.

A further embodiment of the disclosure includes a coated Al—Li alloy particle, which comprises:

an Al—Li alloy particle having a particle size of 0.1 to 200 microns (such as 0.1 to 100 microns, 0.1 to 10 microns, or 1 to 10 microns)

a diffusion layer having a thickness of 0.1 to 100 nanometers, and a coating layer having a thickness of 0.1 to 100 nanometers, wherein the coating comprises at least one metal, metalloid, or non-metal, and wherein the diffusion layer is disposed between the Al—Li particle and the coating layer.

The coating may comprise, for example, at least one metal, metalloid or non metal selected from Ac, Ag, Al, Am, As, At, Au, B, Ba, Be, Bh, Bi, Bk, Ca, Cd, Ce, Cf, Cm, Cn, Co, Cr, Cs, Cu, Db, Ds, Dy, Er, Es, Eu, Fe, Fm, Fr, Ga, Gd, Ge, Hf, Hg, Ho, Hs, In, K, La, Li, Lr, Lu, Lv, Mc, Md, Mg, Mn, Mo, Mt, Na, Nb, Nd, Nh, Ni, No, Np, Og, Os, P, Pa, Pb, Pd, Pm, Po, Pr, Pt, Pu, Ra, Rb, Re, Rf, Rg, Rh, Ru, S, Sb, Sc, Se, Sg, Si, Sm, Sn, Sr, Ta, Tb, Tc, Te, Th, Ti, Tl, Tm, Ts, U, V, W, Y, Yb, Zn, Zr and any combinations of any of these. Such a metal, metalloid, or non-metal can be in the form of a zero-valent element, or could instead be present in a molecule in which is it covalently bound to one or more other elements, such as O, N, C, F, Cl, Br, I, P or any combinations of any of these.

In certain embodiments, the particle has a composition represented by the formula $Li_aAl_bX_cY_d$, where $a+b+c+d=1$, $0.12<a<0.3$, $0.7<b<0.88$, $c=0$ and $d=0$; the diffusion layer has a composition represented by the formula $Li_aAl_bX_c Y_d$ where $a+b+c+d=1$, $0.02<a<0.2$, $0.1<b<0.6$, $0.1<c<0.4$, and $0.1<d<0.6$; and the coating layer has a composition represented by the formula $Li_aAl_bX_cY_d$. where $a+b+c+d=1$, $a=0$, $b=0$, $0.2<c<1$, and $0<d<0.86$; wherein X is Ac, Ag, Al, Am, As, At, Au, B, Ba, Be, Bh, Bi, Bk, Ca, Cd, Ce, Cf, Cm, Cn, Co, Cr, Cs, Cu, Db, Ds, Dy, Er, Es, Eu, Fe, Fm, Fr, Ga, Gd, Ge, Hf, Hg, Ho, Hs, In, K, La, Li, Lr, Lu, Lv, Mc, Md, Mg, Mn, Mo, Mt, Na, Nb, Nd, Nh, Ni, No, Np, Og, Os, P, Pa, Pb, Pd, Pm, Po, Pr, Pt, Pu, Ra, Rb, Re, Rf, Rg, Rh, Ru, S, Sb, Sc, Se, Sg, Si, Sm, Sn, Sr, Ta, Tb, Tc, Te, Th, Ti, Tl, Tm, Ts, U, V, W, Y, Yb, Zn, Zr or any combinations of any of these; and wherein Y is O, N, C, F, Cl, Br, I, P or any combinations of any of these.

A further embodiment of the disclosure is a material comprising an Al—Li alloy; a barrier disposed on the Al—Li alloy; and a metal oxide (such as aluminum oxide or iron oxide) disposed on the barrier. The barrier is any material that inhibits the metal oxide coating, or one or more components thereof, from diffusing into the Al—Li alloy.

Examples of barriers include surfactants. Examples of surfactants include organic acids such as oleic acid and palmitic acid. Other examples of barriers include coatings comprising at least one metal, metalloid, or non-metal, as disclosed herein, such as coatings comprising one or more metal oxides.

The alloy could be in the form of a particle, for example. Such a particle could be contacted with the barrier, such as coated with the barrier, followed by applying a coating of the metal oxide over the barrier. This would result in the barrier being disposed between the Al—Li alloy and the metal oxide.

A diffusion layer that may result simply from coating the alloy with a metal oxide is not considered to be a "barrier." As an example, aluminum oxide readily diffuses into an Al—Li alloy upon deposition, thus a barrier of silicon oxide can be placed between an Al—Li alloy particle and an aluminum oxide coating in order to abate excessive diffusion of the aluminum oxide coating into the particle. It is also expected that diffusion layers will exist between the Al—Li alloy particle and the silicon oxide barrier, as well as between the silicon oxide barrier and the aluminum coating.

Further embodiments of the disclosure include solid-rocket propellants comprising any of the coated Al—Li alloys disclosed herein and an oxidizer and a binder.

A solid propellant of the disclosure may be prepared using the following general constituents: A) an oxidizer such as ammonium perchlorate (AP), B) polymer-based binder, and C) a metallic fuel additive comprised of aluminum-lithium alloy (Al—Li) particles that are coated as disclosed herein, such as coated with aluminum. In many embodiments, such coating is an encapsulation of the Al—Li particles. While any combination of AP/binder/(coated Al—Li) can be used for the purposes of propellant mixing, typical ranges of propellant formulations include: Oxidizer such as (AP): between about 55% and 79% by mass; coated Al—Li alloy (including Al—Li alloy coated with aluminum), such as particles: between about 5% and 40% by mass; Binder: between about 5% and 25% by mass.

The weight ratio of lithium affects the performance of the propellant. When the weight percent of lithium is less than 14%, then the amount of hydrogen chloride that is formed increases rapidly. Weight ratios of greater than 34% result in poor impulse density (total thrust per unit volume of propellant). Thus, typical weight ratios are between about 14% to about 34% lithium to aluminum. Particularly preferred ratios of the embodiments set forth herein are those where the phase of lithium-aluminum microcrystals in a lithium-aluminum alloy is in the simple cubic crystalline phase. Such a phase exists between about 12% and about 20% by weight lithium and is particularly advantageous. This crystalline phase is the most thermodynamically stable phase of the Al—Li alloy. The crystalline phase provides optimum performance capabilities with respect to other phases within the acceptable weight range while also substantially reducing hydrogen chloride gas formation. Such a range is also important because as the lithium content increases over about 20% in, for example, an alloy, the amount of Li products forming, other than the preferred LiCl, increases substantially and free lithium is highly reactive. Such other products may be harmful to the environment whereas LiCl is relatively benign. Thus, while lithium amounts of greater than 20% may be used in a formulation with aluminum, it is preferred to use a formulation where the lithium content is in the range of between about 14% and about 20% by weight, the weight range between 12% and 14% leading to a higher hydrogen chloride formation. Another embodiment is when substantially all of the alloy is crystalline, which occurs at a weight of about 20% lithium and 80% aluminum. In many embodiments, therefore, the amount of Li is less than or equal to about 20% by mass. At this level, the amount of free lithium ions within the alloy is minimized.

While in many other embodiments of the disclosure, the weight percentage of the Al—Li formulation, such as an alloy, which may be in the form of particles, is between about 5% and about 40% by weight in the solid-rocket propellant, in other embodiments ranges between about 20% and about 40% by weight as well as between about 20% and about 30% by weight, as well as all values in between about 5% and about 40% such as about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37% 38%, or 39% are included.

With regards to the oxidizer, the amount of oxidizer in the propellant is typically between about 55% and about 79% by weight. Other ranges include between about 55% and about 65% by weight, between about 58% and about 65% by weight, and between about 60% and about 64% by weight and all values in between including about 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, or 78%. Oxidizers typically contain chlorine with a common oxidizer being ammonium perchlorate.

The disclosure further includes solid-rocket propellants containing a binder. Such binders are often organic. Examples of binders suitable for use herein include hydroxyl-terminated polybutadiene ("HTPB"), carboxyl terminated polybutadiene ("CTBP"), Polybutadiene acrylonitrile ("PBAN"), dicyclopentadiene ("DCPD"), silicone, Polyurethane ("PU"), Plasticized nitrocellulose ("PNC"), Glycidyl Azide polymers ("GAP"), oxetane polymers ("PolyNIMMO"), oxirane polymers ("polyGLYN"), bis-azidomethyloxetane/azideomethylmethyloxetane ("BAMO/AMMO") or combinations thereof. Such binders may be used to augment the fuel for combustion. In many embodiments of the disclosure, the binder is present between about 5% and about 25% by weight. Other ranges include between about 10% and about 20% by weight. Other ranges include between about 10% and about 16% and between about 11% and about 15% by weight and all values between about 5% and about 25% including about 6%, 7%, 8%, 9%, 10%, 11%, 12%, 13%, 14%, 15%, 16%, 17%, 18%, 19%, 20%, 21%, 22%, 23%, or 24%.

In certain embodiments of the disclosure, solid-rocket propellants are provided wherein the Al—Li formulation is a coated Al—Li alloy (including Al—Li alloy coated with aluminum), such as particles, the oxidizer is ammonium perchlorate, and binder is one or more of HTPB, CTBP, PBAN, DCPD, PU, PNC, GAP, PolyNIMMO, polyGLYN, BAMO/AMMO or combinations thereof. In such embodiments, the amount of alloy present is often between about 5% and about 40% by weight. Other embodiments include ranges between about 20% and about 40% by weight as well as between about 20% and about 30% by weight, as well as all values in between 5% and 40% such as about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37% 38%, or 39%. The weight ratio of lithium to aluminum in such alloys is often between about 14% and about 34% by weight, including between about 14% and 30%, between about 14% and 24%, between about 14% and 20%, and between about 16% and 18%, as well as about 15%, 16%, 17%, 18%, 19%, or 20%. In such embodiments, the amount of ammonium perchlorate is often between about 55% and about 79% by weight. Other ranges include between about 55% and about 65% by weight, between about 58% and about 65% by weight, and between about 60% and about 64% by weight, and all values in between including about 56%, 57%, 58%, 59%, 60%, 61%, 62%, 63%, 64%, 65%, 66%, 67%, 68%, 69%, 70%, 71%, 72%, 73%, 74%, 75%, 76%, 77%, or 78%. The amount of binder, such as hydroxyl-terminated polybutadiene in such embodiments, is between about 5% and about 25% by weight. Other ranges include between about 10% and about 20% by weight. Still other ranges include between about 10% and about 16% and between about 11% and about 15% by weight and all values between about 5% and about 25% including about 6%, 7%, 8%, 9%, 10%, 11%, 12%, 13%, 14%, 15%, 16%, 17%, 18%, 19%, 20%, 21%, 22%, 23%, or 24%.

In many embodiments the oxidant is ammonium perchlorate (AP) and the binder is HTPB. In these embodiments, for example, the amount of AP by mass may be between 55% and 65% by mass, including all values in between such as 55.1%, 55.2%, 55.3%, 55.4%, 55.5%, 55.6%, 55.7%, 55.8%, 55.9%, 60.0%, 60.1%, 60.2%, 60.3%, 60.4%, 60.5%, 60.6%, 60.7%, 60.8%, 60.9%, 61.0%, 61.1%, 61.2%, 61.3%, 61.4%, 61.5%, 61.6%, 61.7%, 61.8%, 61.9%, 62.0%, 62.1%, 62.2%, 62.3%, 62.4%, 62.5%, 62.6%, 62.7%, 62.8%, 62.9%, 63.0%, 63.1%, 63.2%, 63.3%, 63.4%, 63.5%, 63.6%, 63.7%, 63.8%, 63.9%, 64.0%, 64.1%, 64.2%, 64.3%, 64.4%, 64.5%, 64.6%, 64.7%, 64.8% and 64.9%.

Further, in these embodiments, the amount of HTPB includes values between about 10% and about 16% and all values in between such as 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8% and 15.9%.

Further, in these and other embodiments, the coated aluminum-lithium alloy, such as particles, is typically between about 75% aluminum and 85% aluminum and between about 15% and 25% lithium and all values in between such as about 75.1%, 75.2%, 75.3%, 75.4%, 75.5%, 75.6%, 75.7%, 75.8%, 75.9%, 76.0%, 76.1%, 76.2%, 76.3%, 76.4%, 76.5%, 76.6%, 76.7%, 76.8%, 76.9%, 77.0%, 77.1%, 77.2%, 77.3%, 77.4%, 77.5%, 77.6%, 77.7%, 77.8%, 77.9%, 78.0%, 78.1%, 78.2%, 78.3%, 78.4%, 78.5%, 78.6%, 78.7%, 78.8%, 78.9%, 79.0%, 79.1%, 79.2%, 79.3%, 79.4%, 79.5%, 79.6%, 79.7%, 79.8%, 79.9%, 80.0%, 80.1%, 80.2%, 80.3%, 80.4%, 80.5%, 80.6%, 80.7%, 80.8%, 80.9%, 81.0%, 81.1%, 81.2%, 81.3%, 81.4%, 81.5%, 81.6%, 81.7%, 81.8%, 81.9%, 82.0%, 82.1%, 82.2%, 82.3%, 82.4%, 82.5%, 82.6%, 82.7%, 82.8%, 82.9%, 83.0%, 83.1%, 83.2%, 83.3%, 83.4%, 83.5%, 83.6%, 83.7%, 83.8%, 83.9%, 84.0%, 84.1%, 84.2%, 84.3%, 84.4%, 84.5%, 84.6%, 84.7%, 84.8%, and 84.9% aluminum; and such as about 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, 20.0%, 20.1%, 20.2%, 20.3%, 20.4%, 20.5%, 20.6%, 20.7%, 20.8%, 20.9%, 21.0%, 21.1%, 21.2%, 21.3%, 21.4%, 21.5%, 21.6%, 21.7%, 21.8%, 21.9%, 22.0%, 22.1%, 22.2%, 22.3%, 22.4%, 22.5%, 22.6%, 22.7%, 22.8%, 22.9%, 23.0%, 23.1%, 23.2%, 23.3%, 23.4%, 23.5%, 23.6%, 23.7%, 23.8%, 23.9%, 24.0%, 24.1%, 24.2%, 24.3%, 24.4%, 24.5%, 24.6%, 24.7%, 24.8% and 24.9% lithium.

In such embodiments, the amount of such coated aluminum-lithium, such as particles, in the propellant formulation ranges between 20% and 30% including 20.1%, 20.2%, 20.3%, 20.4%, 20.5%, 20.6%, 20.7%, 20.8%, 20.9%, 21.0%, 21.1%, 21.2%, 21.3%, 21.4%, 21.5%, 21.6%, 21.7%, 21.8%, 21.9%, 22.0%, 22.1%, 22.2%, 22.3%, 22.4%, 22.5%, 22.6%, 22.7%, 22.8%, 22.9%, 23.0%, 23.1%, 23.2%, 23.3%, 23.4%, 23.5%, 23.6%, 23.7%, 23.8%, 23.9%, 24.0%, 24.1%, 24.2%, 24.3%, 24.4%, 24.5%, 24.6%, 24.7%, 24.8%, 24.9%, 25.0%, 25.1%, 25.2%, 25.3%, 25.4%, 25.5%, 25.6%, 25.7%, 25.8%, 25.9%, 26.0%, 26.1%, 26.2%, 26.3%, 26.4%, 24.5%, 26.6%, 26.7%, 26.8%, 26.9%, 27.0%, 27.1%, 27.2%, 27.3%, 27.4%, 27.5%, 27.6%, 27.7%, 27.8%, 27.9%, 28.0%, 28.1%, 28.2%, 28.3%, 28.4%, 28.5%, 28.6%, 28.7%, 28.8%, 28.9%, 29.0%, 29.1%, 29.2%, 29.3%, 29.4%, 29.5%, 29.6%, 29.7%, 29.8% and 29.9%.

Other embodiments of high performance solid-rocket propellants include those with an AP by mass amount of 61.1%, 61.2%, 61.3%, 61.4%, 61.5%, 61.6%, 61.7%, 61.8%, 61.9%, and 62.0%; HTPC of 11.0%, 11.1%, 11.2%, 11.3%, 11.4%, 11.5%, 11.6%, 11.7%, 11.8%, 11.9%, and 12.0%, and a coated Al—Li alloy (including Al—Li alloy coated with aluminum), such as particles, of between 26.0 and 27.0% including 26.1%, 26.2%, 26.3%, 26.4%, 26.5%, 26.6%, 26.7%, 26.8% and 26.9%. Within such embodiments, one example of a rocket propellant is one with an AP of about 61.5% by mass, HTPB of about 11.7% by mass, and an 80/20 coated aluminum-lithium alloy of about 26.8% by mass. In a second example, a rocket propellant containing about 63.0% AP, about 15.0% HTPB, and about 22.0% of an 83.1%/16.9% coated aluminum-lithium alloy (including Al—Li alloy coated with aluminum) is provided where the alloy is present at a level of about 22.0%. In the first example, the propellant is designed for HCl scavenging propellant whereas the second example is more for would be for a high performance.

In many embodiments of the disclosure, the weight ratio of lithium to aluminum in the Alloy prior to encapsulation or coating with aluminum is between about 14% and about 34% by weight. Further embodiments include weight ratios of lithium to aluminum of between about 14% and 30%, between about 14% and 24%, between about 14% and 20%, and between about 16% and 18%, as well as values in between the weight ranges given. For example, separate embodiments of about 14%, 15%, 16%, 17%, 18%, 19%, or 20% are each further provided herein. When reporting values in weight percent, the understood variability by use of the word "about" is on the order of 1%. Thus, a weight percent of about 15% means 14% to 16%. The use of the word "about" is meant to modify all weight percent values set forth herein whether explicitly present or not.

The following clauses provide numerous embodiments and are non-limiting:

Clause 1. An Al—Li alloy coated with aluminum.

Clause 2. One or more particles of an Al—Li alloy coated with aluminum.

Clause 3. The Al—Li alloy of clauses 1-2, wherein the Al—Li alloy is in the cubic phase.

Clause 4. The Al—Li alloy of clauses 2-3, wherein the particle is size, not including the aluminum coating, is between about 10 microns and 200 microns.

Clause 5. The Al—Li alloy of clause 4, wherein the particle size is between about 10 and about 100 microns.

Clause 6. The Al—Li alloy of clause 5, wherein the particle size is between about 20 and about 50 microns.

Clause 7. The Al—Li alloy of clause 5, wherein the particle size is between about 25 and about 45 microns.

Clause 8. The Al—Li alloy of clause 7, wherein the particle size is about 25, 26, 27, 28, 29, 30, 31, 32, 33, 34, 35, 36, 37, 38, 39, 40, 41, 42, 43, 44, 46, 47, 48, 49, or about 50 microns.

Clause 9. The aluminum-coated Al—Li alloy of clauses 1-8, wherein the thickness of the aluminum coating is between about 100 nm and about 1 micron.

Clause 10. The aluminum-coated Al—Li alloy of clauses 1-8, wherein the thickness of the aluminum coating is between about 100 nm and about 900 nm.

Clause 11. The aluminum-coated Al—Li alloy of clauses 1-8, wherein the thickness of the aluminum coating is between about 100 nm and about 500 nm.

Clause 12. The aluminum-coated Al—Li alloy of clauses 1-11, wherein the aluminum coating is at least about 95% pure.

Clause 13. The aluminum coated Al—Li alloy of clause 12, wherein the aluminum coating is at least about 99% pure.

Clause 14. The aluminum coated Al—Li alloy of clause 13, wherein the aluminum coating is at least about 99.9% pure.

Clause 15. The aluminum coated Al—Li alloy of clause 13, wherein the aluminum coating is at least about 99.99% pure.

Clause 16. The aluminum-coated Al—Li alloy of clauses 1-16, wherein the percent lithium in the aluminum-coated Al—Li alloy is between about 14% and about 34%.

Clause 17. The aluminum-coated Al—Li alloy of clauses 1-16, wherein the percent lithium in the aluminum-coated Al—Li alloy is between about 12% and about 20%.

Clause 18. The aluminum-coated Al—Li alloy of clauses 1-16, wherein the percent lithium in the aluminum-coated Al—Li alloy is between about 14% and about 30% by weight.

Clause 19. The aluminum-coated Al—Li alloy of clauses 1-16, wherein the percent lithium in the aluminum-coated Al—Li alloy is between about 14% and about 24% by weight.

Clause 20. The aluminum-coated Al—Li alloy of clauses 1-16, wherein the percent lithium in the aluminum-coated Al—Li alloy is between about 14% and about 20% by weight.

Clause 21. The aluminum-coated Al—Li alloy of clauses 1-16, wherein the percent lithium in the aluminum-coated Al—Li alloy is between about 16% and about 18% by weight.

Clause 22. The aluminum-coated Al—Li alloy of clauses 1-16, wherein the percent lithium in the aluminum-coated Al—Li alloy is about 14%, 15% 16%, 17%, 18%, 19%, or about 20% by weight.

Clause 23. The aluminum-coated Al—Li alloy of clause 22, wherein the percent lithium is about 17%.

Clause 24. The aluminum-coated Al—Li alloy of clause 23, wherein the aluminum coating continuously coats the Al—Li alloy.

Clause 25. The aluminum-coated Al—Li alloy of clauses 1-23, wherein the aluminum completely coats the Al—Li alloy.

Clause 26. The aluminum-coated Al—Li alloy of clauses 1-25, wherein water does not react with the aluminum-coated Al—Li alloy.

Clause 27. A solid-rocket propellant comprising an aluminum-coated Al—Li alloy, an oxidizer, and a binder.

Clause 28. A solid-rocket propellant comprising an aluminum-coated Al—Li alloy particle of clauses 2-26, an oxidizer, and a binder.

Clause 29. The solid-rocket propellant of clauses 27-28, wherein the weight percentage of the aluminum-coated Al—Li alloy in the solid-rocket propellant is between about 5% and about 40% by weight.

Clause 30. The solid-rocket propellant of clause 29, wherein the weight percentage of the coated Al—Li alloy in the propellant is between about 20% and about 40% by weight.

Clause 31. The solid-rocket propellant of clause 29, wherein the weight percentage of the coated Al—Li alloy in the propellant is between about 20% and about 30% by weight.

Clause 32. The solid-rocket propellant of clause 29, wherein the weight percentage of the coated Al—Li alloy formulation is 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37% 38%, 39% or 40% by weight.

Clause 33. The solid-rocket propellant of clauses 28-31, wherein the weight percent of oxidizer is between about 55% and about 79% by weight.

Clause 34. The solid-rocket propellant of clause 33, wherein the weight percent of oxidizer is between about 60% and about 70% by weight.

Clause 35. The solid-rocket propellant of clauses 34, wherein the weight percent of oxidizer is between about 58% and about 70% by weight.

Clause 36. The solid-rocket propellant of clause 33, wherein the weight percent of oxidizer is about 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, or 78%.

Clause 37. The solid-rocket propellant of clauses 28-36, wherein the oxidizer contains chlorine.

Clause 38. The solid-rocket propellant of clause 37, wherein the oxidizer is ammonium perchlorate.

Clause 39. The solid-rocket propellant of clauses 19-30, wherein the weight percentage of binder is between about 5% and about 25% by weight.

Clause 40. The solid-rocket propellant of clauses 29-39, wherein the weight percentage of binder is between about 5% and about 20% by weight.

Clause 41. The solid-rocket propellant of clause 40, wherein the weight percentage of binder is between about 10% and about 20% by weight.

Clause 42. The solid-rocket propellant of clause 41, wherein the weight percentage of binder is between about 12% and about 20% by weight.

Clause 43. The solid-rocket propellant of clause 42, wherein the weight percentage of binder is between about 15% and about 20% by weight.

Clause 44. The solid-rocket propellant of clauses 40, wherein the weight percentage of binder is about 5%, 6%, 7%, 8%, 9%, 10%, 11%, 12%, 13%, 14%, 15%, 16%, 17%, 18%, 19%, 20%, 21%, 22%, 23%, 24% or 25% by weight.

Clause 45. The solid-rocket propellant of clauses 28-43, wherein the binder is hydroxyl-terminated polybutadiene ("HTPB"), carboxyl terminated polybutadiene ("CTBP"), Polybutadiene acrylonitrile ("PBAN"), dicyclopentadiene ("DCPD"), silicone, Polyurethane ("PU"), Plasticized nitrocellulose ("PNC"), Glycidyl Azide polymers ("GAP"), oxetane polymers ("PolyNIMMO"), oxirane polymers ("polyGLYN"), bis-azidomethyloxetane/azideomethylmethyloxetane ("BAMO/AMMO") or combinations thereof.

Clause 46. The solid-rocket propellant of clause 45, wherein the oxidizer is ammonium perchlorate and the binder is one or more of HTPB, CTBP, PBAN, DCPD, PU, PNC, GAP, PolyNIMMO, polyGLYN, BAMO/AMMO and wherein the aluminum-coated Al—Li alloy is present between about 5% and about 40% by weight.

Clause 47. The solid-rocket propellant of clause 46, wherein the aluminum-coated Al—Li alloy is present between about 10% and about 20% by weight.

Clause 48. The solid-rocket propellant of clause 47, wherein the aluminum-coated Al—Li alloy is present between about 15% and about 20% by weight.

Clause 49. A solid-rocket propellant comprising an aluminum-coated Al—Li alloy particle, an oxidizer, and a binder.

Clause 50. A solid-rocket propellant comprising a metal-coated Al—Li alloy particle, an oxidizer, and a binder provided the metal is not iron.

Clause 51. The solid-rocket propellant of clause 50, wherein the metal is selected from magnesium, titanium, zirconium, and berellium.

Clause 52. The solid-rocket propellant of clause 51, wherein the coating comprise an alloy of one of more of magnesium, titanium, zirconium, aluminum or beryllium.

Clause 53. A solid-rocket propellant comprising an aluminum-coated Al—Li alloy particle, an oxidizer, and a binder.

Clause 54. A solid-rocket propellant comprising a metal-coated Al—Li alloy particle, an oxidizer, and a binder wherein the metal is an alloy of iron.

Clause 55. A solid-rocket propellant comprising a non-metal coated Al—Li alloy particle, an oxidizer, and a binder.

Clause 56. The solid-rocket propellant of clause 55, wherein the coating contains silicon, carbon, or both.

Clause 57. A solid-rocket propellant comprising one or more coated Al—Li particles, an oxidizer, and a binder.

Clause 58. An Al—Li alloy coated with a metal oxide.

Clause 59. The alloy of Clause 58, wherein the metal oxide is aluminum oxide or iron oxide.

Clause 60. A solid-rocket propellant comprising a metal-oxide-coated Al—Li alloy, an oxidizer, and a binder.

Clause 61. The solid-rocket propellant of clause 60, wherein the oxide is aluminum oxide or iron oxide.

Clause 62. One or more particles of an Al—Li alloy coated with a coating that comprises at least one metal, metalloid, or non-metal.

Clause 63. The coated Al—Li alloy of clause 62, wherein the metal, metalloid, or non-metal is in the form of a zero-valent element.

Clause 64. The coated Al—Li alloy of clause 62, wherein the metal, metalloid, or non-metal is present in a molecule in which it is covalently bound to one or more other elements.

Clause 65. The coated Al—Li alloy of clause 64, wherein the metal, metalloid, or non-metal is in the form of an oxide, nitride, carbide, halide, or phosphate.

Clause 66. The coated Al—Li alloy of any one of clauses 62-65, wherein the coating comprises at least one of aluminum, silicon, boron, hafnium, tin, iron, magnesium, titanium, zirconium and beryllium.

Clause 67. The coated Al—Li alloy of clause 66, wherein the coating comprises aluminum, silicon, or both aluminum and silicon.

Clause 68. The coated Al—Li alloy of any one of clauses 62-67, wherein the thickness of the coating is from 1 nm to 10 nm.

Clause 69. The coated Al—Li alloy of any one of clauses 62-68, wherein the coating that comprises the at least one metal, metalloid, or non-metal is a first coating, and further comprising a second coating disposed over the first coating, wherein the second coating comprises at least one metal, metalloid, or non-metal.

Clause 70. The coated Al—Li alloy of clause 69, which comprises one or more particles of Al—Li alloy coated with a first coating comprising aluminum oxide, and which further comprises a second coating comprising silicon oxide over the first coating comprising aluminum oxide.

Clause 71. The coated Al—Li alloy of clause 70, which comprises:

a first diffusion layer disposed between the alloy and the aluminum oxide coating and having a composition represented by the formula $Li_aAl_bSi_cO_d$, wherein $0.1<a<0.2$, $0.6<b<0.9$, $0<c<0.1$, and $0.01<d<0.2$, and a second diffusion layer disposed between the aluminum oxide coating and the silicon oxide coating and having a composition represented by formula $Li_aAl_bSi_cO_d$, wherein $0<a<0.05$, $0.2<b<0.8$, $0.01<c<0.3$, and $0.2<d<0.6$.

Clause 72. A coated Al—Li alloy particle, which comprises:

an Al—Li alloy particle having a particle size of 1 to 100 microns, a diffusion layer having a thickness of 0.1 to 100 nanometers, and a coating layer having a thickness of 0.1 to 100 nanometers, wherein the coating comprises at least one metal, metalloid, or non-metal, and wherein the diffusion layer is disposed between the Al—Li particle and the coating layer.

Clause 73. The coated Al—Li alloy particle of clause 72, wherein the metal, metalloid, or non-metal is in the form of a zero-valent element.

Clause 74. The coated Al—Li alloy particle of clause 72, wherein the metal, metalloid, or non-metal is present in a molecule in which it is covalently bound to one or more other elements selected from O, N, C, F, Cl, Br, I, P and any combinations of any of these.

Clause 75. The coated Al—Li alloy particle of clause 72, wherein:

the particle has a composition represented by the formula $Li_aAl_bX_c\ Y_d$, where $a+b+c+d=1$, $0.12<a<0.3$, $0.7<b<0.88$, $c=0$ and $d=0$;

the diffusion layer has a composition represented by the formula $Li_aAl_bX_cY_d$, where a+b+c+d=1, 0.02<a<0.2, 0.1<b<0.6, 0.1<c<0.4, and 0.1<d<0.6; and a coating layer has a composition represented by the formula $Li_aAl_bX_c Y_d$, where a+b+c+d=1, a=0, b=0, 0.2<c<1, and 0<d<0.86;

wherein X is Ac, Ag, Al, Am, As, At, Au, B, Ba, Be, Bh, Bi, Bk, Ca, Cd, Ce, Cf, Cm, Cn, Co, Cr, Cs, Cu, Db, Ds, Dy, Er, Es, Eu, Fe, Fm, Fr, Ga, Gd, Ge, Hf, Hg, Ho, Hs, In, K, La, Li, Lr, Lu, Lv, Mc, Md, Mg, Mn, Mo, Mt, Na, Nb, Nd, Nh, Ni, No, Np, Og, Os, P, Pa, Pb, Pd, Pm, Po, Pr, Pt, Pu, Ra, Rb, Re, Rf, Rg, Rh, Ru, S, Sb, Sc, Se, Sg, Si, Sm, Sn, Sr, Ta, Tb, Tc, Te, Th, Ti, Tl, Tm, Ts, U, V, W, Y, Yb, Zn, Zr or any combinations of any of these; and wherein Y is O, N, C, F, Cl, Br, I, P or any combinations of any of these.

Clause 76. A solid-rocket propellant comprising the coated Al—Li alloy of any one of clauses 62-75, an oxidizer, and a binder.

Clause 77. A material comprising: an Al—Li alloy; a barrier disposed on the Al—Li alloy; and a metal oxide disposed on the barrier.

Clause 78. The material of clause 77, wherein the Al—Li alloy is in the form of a particle.

Clause 79. The material of any one of clauses 77-78, which comprises: an Al—Li alloy particle coated with the barrier; and a coating disposed over the barrier, wherein the coating comprises the metal oxide.

Clause 80. The material of any one of clauses 77-79, wherein the metal oxide is aluminum oxide or iron oxide.

Clause 81. The material of any one of clauses 77-80, wherein the barrier is a surfactant.

Clause 82. The material of clause 81, wherein the surfactant is an organic acid.

Clause 83. The material of clause 82, wherein the organic acid is oleic acid, palmitic acid, or both.

Clause 84. The material of any one of clauses 77-80, wherein the barrier is a coating that comprises at least one metal, metalloid, or non-metal.

Clause 85. The material of clause 84, wherein the metal, metalloid, or non-metal is in the form of a zero-valent element.

Clause 86. The material of clause 84, wherein the metal, metalloid, or non-metal is present in a molecule in which it is covalently bound to one or more other elements.

Clause 87. The material of clause 86, wherein the metal, metalloid, or non-metal is in the form of an oxide, nitride, carbide, halide, or phosphate.

Clause 88. A solid rocket propellant comprising a material of any one of clauses 77-87, an oxidizer, and a binder.

EXAMPLES

Example 1—Preparation of Aluminum-Coated Particles-Physical Vapor Deposition Aluminum-lithium alloy particles (80/20 wt. % Al—Li alloy, LiAl Phase, Gelon LIB Co., Ltd.) were coated with neat aluminum (18 Ga wire, 99.99% purity) using physical vapor deposition. Neat aluminum wire was placed into tungsten coils (F5-3X.040W, R. D. Mathis Company) and installed into a vacuum chamber. A dish containing the Al—Li powder was placed below the tungsten coils such that there was not obstructions from the coils' line of sight. The vacuum chamber was then evacuated to at least 4.5E-5 Torr. Once the appropriate vacuum condition was attained, high current was passed thought the tungsten coil, which caused the aluminum to melt and subsequently sublimate/evaporate. The powder was agitated such that all surfaces of the Al—Li alloy particles were coated with neat aluminum during the evaporation process.

Example 2—Physical Liquid Deposition

Aluminum-lithium alloy particles (80/20 wt. % Al—Li alloy, LiAl Phase, Gelon LIB Co., Ltd.) were coated with Viton (FC-2175, 60/40 wt. % copolymer of vinylidene fluoride and hexafluoropropylene, 3M Fluorel™ Fluoroelastomer) using physical liquid deposition. The Viton was dissolved in anhydrous ethyl acetate (99.8%, Sigma Aldrich) to make a 92:8 ethyl acetate: Viton mixture. Once the Viton was fully dissolved, Al—Li alloy powder was added and thoroughly mixed. The mixture was then poured into a wide dish and a vacuum chamber was used to slowly pull off the solvent.

Aluminum-lithium alloy particles (80/20 wt. % Al—Li alloy, LiAl Phase, Gelon LIB Co., Ltd.) were coated with PE (low-density polyethylene, Plastomat) using physical liquid deposition. The PE was dissolved in xylene (99%, Xylol Xylene, Crown) to make a 99:1 xylene:PE mixture. The mixture was heated to 130° C. and stirred until full dissolution was achieved. Al—Li alloy powder was then added and thoroughly mixed. The mixture was then poured into a wide dish under forced convection to slowly pull off the solvent.

Example 3—Chemical Liquid Deposition

Aluminum-lithium alloy particles (80/20 wt. % Al—Li alloy, LiAl Phase, Gelon LIB Co., Ltd.) were coated with neat iron using chemical liquid deposition. Al—Li alloy powder was suspended in polyethylene glycol 200 (PEG-200, ChemWorld) in a flask. The PEG-200 was sparged of any entrapped oxygen and the flask was purged of oxygen via continuous argon flow. The mixture was stirred and heated to 180° C. Iron carbonyl ($Fe(CO)_5$, 99.99%, Sigma Aldrich) was then added to the mixture. At 180° C., the iron carbonyl decomposes into iron and carbon monoxide, allowing the iron to coat the Al—Li alloy particles. The mixture was then cooled down and the composite powder was washed with ethanol. The powder was then dried in a vacuum oven to slowly pull off the solvent.

Example 4—Compatibility Tests

Once each coated Al—Li particle type was created, its reactivity was observed with water. Uncoated Al—Li alloy particles vigorously react with the water, forming hydrogen bubbles at the particle surface as LiOH is formed. The first step in determining the coating efficacy was to test how reactive the coated powder was with water. With the coated particles, the reactivity with was water was drastically retarded or completely arrested.

Once it was determined that the coating was successful, the powder was tested for compatibility in a solid propellant formulation. A small amount of coated powder (approximately 50 mg) was mixed with AP (200 μm blend with ground AP, RCS Rocket Motor Components) and with uncured HTPB (R-45 resin, isodecyl pelargonate plasticizer, and modified MDI isocyanate curative; RCS Rocket Motor Components) separately in order to insure that no reactions occurred in the binary mixtures. One gram of solid rocket propellant was then mixed at the following approximate ratio: 67/15/18 wt. % AP/HTPB/(coated Al—Li powder). The propellant mixture was monitored for 10 days in order to ensure that no incompatibilities were encountered during the curing process. Mixtures were then subsequently made at 2 grams, 10 grams, 250 grams, and 3 kg in order to ensure that no incompatibilities were observed as the formulation was scaled.

Example 5—Preparation of Solid-Rocket Propellant with Coated-Aluminum-lithium Alloy Particles For all solid propellants tested, the binder was first produced by thoroughly mixing hydroxyl-terminated polybutadiene resin (HTPB, R-45M, typically about 73 wt. %), a plasticizer (isodecyl pelargonate, 15 wt. %), and a curative (modified MDI, typically about 12 wt. %). The exact HTPB-to-curative ratio was adjusted for each mix based on measured % OH content for the HTPB resin and measured % NCO content for the curative. Once all binder constituents were fully mixed, any powdered metal fuels were added and thoroughly mixed. One half of the ammonium perchlorate (AP) powder was then added and thoroughly mixed. The second half of the AP powder was then added and thoroughly mixed. All propellant constituents were mixed remotely in a 1.25-gallon planetary mixer.

Once all solid propellant constituents were thoroughly mixed into the formulation, they were poured and packed into paper casting tubes. Two endcaps and a center-perforating mandrel were used to complete the mold assembly. Once the propellant was cured (7-10 days), the endcaps were removed and the mandrel was extracted-leaving a paper-tube lined solid propellant grain. That grain was then inserted into an aluminum motor casing with a nozzle, aft closure, and a forward closure with pressure ports. Finally, an electric match was inserted for motor ignition. A propellant with the following components resulted: AP: 61.5; HTPB: 11.7%; Aluminum coated Al—Li alloy (80/20 wt. % Al/Li after coating process): 26.8% (high performance HCl scavenging).

Example 6-Preparation of Solid Rocket Propellant with Coated-Aluminum-Lithium Alloy Particles For all solid propellants tested, the binder was first produced by thoroughly mixing hydroxyl-terminated polybutadiene resin (HTPB, R-45M, typically about 73 wt. %), a plasticizer (isodecyl pelargonate, 15 wt. %), and a curative (modified MDI, typically about 12 wt. %). The exact HTPB-to-curative ratio was adjusted for each mix based on measured % OH content for the HTPB resin and measured % NCO content for the curative. Once all binder constituents were fully mixed, any powdered metal fuels were added and thoroughly mixed. One half of the ammonium perchlorate (AP) powder was then added and thoroughly mixed. The second half of the AP powder was then added and thoroughly mixed. All propellant constituents were mixed remotely in a 1.25-gallon planetary mixer.

Once all solid propellant constituents were thoroughly mixed into the formulation, they were poured and packed into paper casting tubes. Two endcaps and a center-perforating mandrel were used to complete the mold assembly. Once the propellant was cured (7-10 days), the endcaps were removed and the mandrel was extracted-leaving a paper-tube lined solid propellant grain. That grain was then inserted into an aluminum motor casing with a nozzle, aft closure, and a forward closure with pressure ports. Finally, an electric match was inserted for motor ignition. A propellant with the following components resulted: AP: 67.0%; HTPB: 15.0%; Aluminum coated Al—Li alloy (83.1/16.9 wt. % Al/Li after coating process): 18.0% (high performance propellant and higher binder content for increased processability).

Example 7—Preparation of Solid Rocket Propellant with Uncoated Aluminum-Lithium Alloy Particles Solid composite propellants were prepared using the following fuel additives: A.) neat aluminum (Alfa Aesar, −325 mesh, 99.5% purity); and B.) 80/20 wt. % Al—Li alloy (stable LiAl intermetallic phase) (Sigma Aldrich). The as-received 80/20 Al—Li alloy was sieved to −325 mesh (<44 μm) to be comparable with the as-received neat aluminum powder. The particle size distributions for both powders were determined by laser diffraction (Malvern Mastersizer Hydro 2000 μP) using isopropyl alcohol as the dispersant medium. Surface imaging of both powders was performed by scanning electron microscopy (SEM, FEI Quanta 3D-FEG).

Imaging and particle sizing of the sieved neat aluminum (for comparison) and 80/20 Al—Li alloy powders showed that neat aluminum was nominally equiaxed in morphology and that 80/20 Al—Li alloy had an irregularly faceted morphology, typically with sharp/brittle surface features. The neat aluminum and Al—Li alloy powders had mean particle sizes (arithmetic) of 17.1 μm and 29.8 μm and volume weighted mean particle sizes (D) of 19.3 μm and 33.3 μm respectively.

The as-received 80/20 Al—Li alloy was sieved to −325 mesh (<44 μm) to be comparable with the as-received neat aluminum powder. The particle size distributions for both powders were determined by laser diffraction (Malvern Mastersizer Hydro 2000 μP) using isopropyl alcohol as the dispersant medium. Surface imaging of both powders was performed by scanning electron microscopy (SEM, FEI Quanta 3D-FEG).

The constituents used for the propellant formulations included: ammonium perchlorate (ATK, 20 μm and 200 μm) and HTPB (Firefox, R45) cured with an aromatic polyisocyanate (Desmodur, E744) as the binding agent. The following formulation was used to prepare approximately 20 grams of propellant for each mixture:

Metal Additive: 26.8%
Coarse AP, 200 μm: 49.2%
Fine AP, 20 μm: 12.3%
HTPB (11.5% curative): 11.7%

For comparison with theoretical performance predictions in FIG. 8 and FIG. 9, these ratios correspond to an O/F of 1.60, a fuel additive wt. % of 69.6%, and a solids loading of 88.3%. No incompatibilities were observed with the aromatic polyisocyanate curative, though the working time of the wetted propellant was short (approximately 30 minutes). The values displayed within the graphs of FIGS. 8 and 9, such as 0.99, 0.95, 0.9, 0.85 etc. correspond to percentages of 99%, 95%, 90%, 85% etc., respectively.

Propellant constituents were resonant mixed (Resodyn LabRAM resonant mixer) in a 60 mL container (McMaster-Carr 42905T23) for 10 min at 90% intensity. Strands were then packed into 5.8 mm diameter cylindrical molds and cured in air for approximately 3 days at room temperature. The burning characteristics of the propellants were investigated using a color high-speed camera (Vision Research, Phantom v7.3) at 1000 fps in a vented fume hood.

Example 8—Thermochemical Simulations

Simulations were completed for four coating materials (iron, aluminum, polyethylene, and Viton®) in order to determine the theoretical detriment to performance that would accompany each coating as a function of coating content (weight percent of the total composite coated metal fuel particles). Cheetah 7.0 equilibrium code (JCZS product library and JCZ3 gas equation of state) was used for all calculations. Hydroxyl-terminated polybutadiene (HTPB) was used as the binder for all simulations at a constant value of 15 wt. % (i.e., constant 85% solids loading). The oxidizer-to-fuel ratio was varied from 1 to 3 for each set of simulations and coating contents ranged from 0% (uncoated Al—Li alloy) to 20%. The Al—Li alloy powder used in all simulations was 80/20 wt. % Al—Li alloy (LiAl phase). A total of 20,000 simulations were performed for each coating material to create a specific impulse performance map of the mixtures ratios of interest. For comparison, it should be noted that neat aluminum has a maximum theoretical Isp of approximately 264 s at 85% solids loading.

The simulations indicate that an aluminum coating does not negatively affect the $I_{SP}$ in the mixture ratios of interest. Therefore, an aluminum coating of less than 20% should result in an $I_{SP}$ that is comparable to uncoated Al—Li, potentially making aluminum the coating material of choice for high performance solid rocket propellants. The simulations further indicate that iron, PE, and Viton coatings all have a detriment to theoretical ideal $I_{SP}$ within the mixture ratios of interest. Specifically, iron and PE coatings only have a higher $I_{SP}$ than neat aluminum when the coating contents are less than approximately 14% and 16% respectively. Viton, however, remains superior to neat aluminum for all coating contents of interest.

Example 9—Preparation of Rocket Motor

Figure 7:
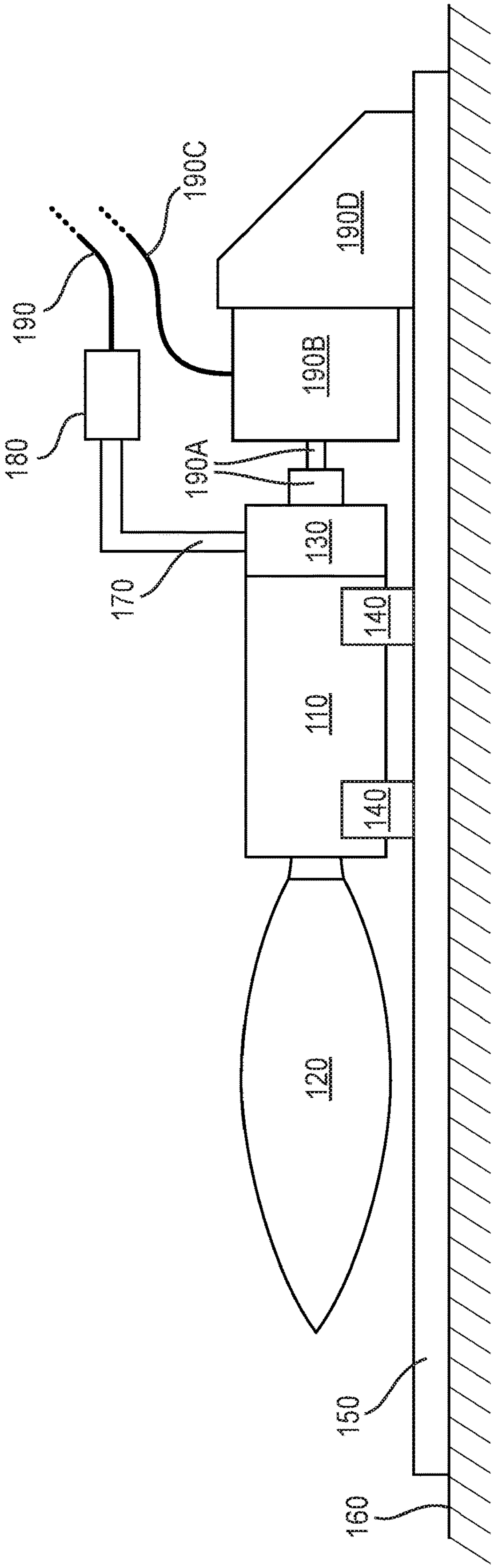
FIG. 7 is a schematic showing the Rocket Performance Comparison Test

A standard "2×4" rocket motor (i.e., center perforated grain that that is roughly 2 inches in diameter, 4 inches long, and ¼ inch web thickness; 110 in FIG. 7) was cast using the following formulation: 18% aluminum-coated aluminum-lithium alloy (25-100 micron particle size, coated three times with neat aluminum via a physical vapor deposition method in accordance with Example 1, 15% hydroxyl-terminated polybutadiene, 67% ammonium perchlorate (70:30 coarse-to-fine ratio, 200 micron and 30 micron). The propellant was physically mixed via planetary mixer and then cast into a grain mold with a center perforating mandrel. After the propellant was fully cured, the grain was cut to the appropriate length and loaded into a custom solid rocket motor casing (0.302 inch nozzle throat diameter). The forward closure of the rocket motor (130) was equipped with a head end pressure port that was connected to a GE UNIK 5000 amplified pressure transducer (180) via a pressure line (170). The rocket motor was secured to a metal base plate (150) for hardware mounting with linear bearings (140). A steel anvil (190D) was used to anchor the load cell to the base plate. The entire rocket motor assembly was put atop a concrete test stand (160). Upon ignition, an exhaust plume (120) from the rocket motor formed. The forward closure was also connected to an Interface 1210AO-1K-B load cell (190B) with an Interface DMA2 signal conditioner and a rod (190A) for transferring force from the rocket motor to the load cell. The raw data from the pressure transducer and load cell was transmitted via a data link (190 for pressure transducer and 190C for the load cell) and acquired with a PicoScope 4262 16-bit oscilloscope data acquisition unit. Data were analyzed with conventional methods.

Example 10—Performance Testing of Propellant

Solid rocket motors ~2 inch diameter, ~4 inch long, and ~¼ inch web propellant grains were tested using the propellant prepared according to Example 9. Motors were compared with a standard aluminized propellant of the same geometry and approximate average chamber pressure (~4.8 MPa, ~700 psi). A standardized aluminized propellant comprised of 14 wt. % aluminum powder, 71 wt. % ammonium perchlorate powder, and 15 wt. % hydroxyl-terminated polybutadiene. This formulation was chosen as it is the current general standard for high-performance solid rocket propellant in most fielded systems and architectures. The characteristic velocity ("c*"), which is a measure of the combustion performance of a propellant independent of the nozzle performance, was compared. It was found that the baseline standardized aluminized propellant had a measured c* of 1399 m/s (87% of theoretical values) whereas the propellant of Example 9 had a measured c* of 1528 m/s (97% of theoretical values). This outcome indicates that the propellant of Example 9 would have a 9.2% $I_{SP}$ increase over the standardized aluminized propellant at this scale, assuming an identical nozzle performance efficiency—with a reduction in two-phase flow losses, the delivered $I_{SP}$ increase would be expected to be even greater.

Example 11—Flight Test Demonstrations

A coated Al—Li alloy powder was made by coating 83/17 wt. % Al/Li alloy with a combination silica-alumina coating via atomic layer deposition. A solid rocket propellant was then made with the coated Al—Li alloy using the following formulation: 16% coated Al—Li alloy powder, 5-45 micron particle size; 2% aluminum powder, 5 micron particle size; 67% ammonium perchlorate powder, 200/30 micron blend; and 15% hydroxyl-terminated polybutadiene binder. The binder was comprised of: 73.4% R-45M hydroxyl-terminated polybutadiene resin; 35% isedecyl pelagonate plasticizer; and 11.6% methylenediphenyl diisocyanate currative. The propellant was resonantly mixed under vacuum and cast into several 4-inch diameter, 6-inch long center-perforated propellant grains. Three grains were then loaded into a single motor with a nozzle scaled for roughly 600 psi operating pressure.

The motors were used in two flight test demonstrations of an 8-inch diameter, 6-foot 2-inch tall sounding rocket. Identical solid rocket motors were mixed and cast using a standard solid rocket propellant (identical processing methodology): 18% aluminum, 5-45 micron; 67% ammonium perchlorate powder, 200/30 micron blend; and 15% hydroxyl-terminated polybutadiene binder (same binder formulation as with the coated Al—Li alloy propellant). This propellant was also launched in two flight test demonstrations using the same sounding rockets. It was found that the coated Al—Li alloy propellant produced a 15.1%+0.4% increase in overall apogee height. This difference in apogee yields a delivered specific impulse increase of approximately 20 seconds for this sounding rocket platform.

Example 12—Al—Li Particles Coated by Atomic Layer Deposition

Al—Li alloy particles were fluidized in a vacuum fluidized bed reactor with and nitrogen fluidization gas at 120 C.

Sequentially and separately, trimethylaluminum and water gas phase precursors were entrained into the fluidization gas such that the diluted precursors mixed completely with the fluidized particles and the reactor was completely purged of each precursor before the other was introduced to the reactor. This trimethylaluminum-purge-water-purge sequence was repeated 50 times to produce an $Al_2O_3$ film on the surface of the alloy particle.

Example 13—Al—Li Alloy Particles Coated with an Oxide Bilayer Via ALD

Al—Li alloy particles were fluidized in a vacuum fluidized bed reactor with and nitrogen fluidization gas at 120 C. Sequentially and separately, aminopropyltriethoxysilane (APTES) and ozone and water gas phase precursors were entrained into the fluidization gas such that the diluted precursors mixed completely with the fluidized particles and the reactor was completely purged of each precursor before the other was introduced to the reactor. This APTES-purge-ozone-purge-water-purge sequence was repeated 25 times to produce an $SiO_2$ film on the surface of the Al—Li alloy particle.

Following the $SiO_2$ reaction, sequentially and separately, trimethylaluminum and water gas phase precursors were entrained into the fluidization gas such that the diluted precursors mixed completely with the fluidized particles and the reactor was completely purged of each precursor before the other was introduced to the reactor. This trimethylaluminum-purge-water-purge sequence was repeated 50 times to produce an $Al_2O_3$ film on the surface of the $SiO_2$ coated Al—Li alloy particle.

The invention claimed is:

1. One or more particles of an Al—Li alloy coated with a first coating consisting of a metal, and a second coating disposed over the first coating, wherein the second coating comprises a metal, metalloid, or an oxide, nitride, carbide, halide, or phosphate thereof, wherein the Al—Li alloy comprises a weight ratio of Li to Al between 14% and 34%, and wherein the first coating comprises up to 20% by weight of the Al in the Al—Li alloy.

2. The coated Al—Li alloy of claim 1, wherein the thickness of the first coating is from 1 nm to 10 nm.

3. The coated Al—Li alloy of claim 1, wherein the first coating consists of aluminum, and the second coating comprises silicon oxide.

4. The coated Al—Li alloy of claim 1, further comprises a first diffusion layer between the alloy and the first coating.

5. The coated Al—Li alloy of claim 4, wherein:

the Al—Li alloy particle has a particle size of 0.1 to 200 microns, the first diffusion layer has a thickness of 0.1 to 100 nanometers, and the first coating has a thickness of 0.1 to 100 nanometers.

6. A solid-rocket propellant comprising the coated Al—Li alloy of claim 1, an oxidizer, and a binder.

7. A material comprising:

an Al—Li alloy comprising a weight ratio of Li to Al between 14% and 34%;

a barrier disposed on the Al—Li alloy;

a first coating comprising up to 20% by weight of the Al in the Al—Li alloy disposed on the barrier; and a second coating disposed over the first coating, wherein the second coating comprises a metal, metalloid, or an oxide, nitride, carbide, halide, or phosphate thereof.

8. The coated Al—Li alloy of claim 3, wherein the first coating has a thickness of 0.1 to 5.0 nanometers, and the second coating has a thickness of 0.1 to 5.0 nanometers.

9. A solid-rocket propellant comprising the coated Al—Li alloy of claim 5, an oxidizer, and a binder.

10. The coated Al—Li alloy of claim 1, wherein the second coating comprises at least one of aluminum, silicon, boron, hafnium, tin, iron, magnesium, titanium, zirconium and beryllium.

11. The coated Al—Li alloy of claim 10, wherein the second coating comprises aluminum, silicon, or both aluminum and silicon.

12. The coated Al—Li alloy of claim 1, wherein the second coating comprises an oxide, nitride, carbide, halide, or phosphate.

13. The coated Al—Li alloy of claim 1, wherein the second coating comprises silicon.

* * * * *